United States Patent [19]

Nogami et al.

[11] Patent Number: 4,497,395

[45] Date of Patent: Feb. 5, 1985

[54] ANTI CREEP VEHICLE BRAKING SYSTEM ALLOWING FURTHER ADDITIONAL BRAKING ACTION APPLICATION

[75] Inventors: Takahiro Nogami; Shigetaka Akahori; Harumi Oohori; Nobuyasu Nakanishi, all of Toyota, Japan

[73] Assignee: Toyota Jidosha Kabushiki Kaisha, Toyota, Japan

[21] Appl. No.: 350,571

[22] Filed: Feb. 22, 1982

[30] Foreign Application Priority Data

May 22, 1981 [JP] Japan .................................. 56-74977
May 22, 1981 [JP] Japan .................................. 56-78235
May 22, 1981 [JP] Japan .................................. 56-79732

[51] Int. Cl.[3] .............................................. B60K 41/28

[52] U.S. Cl. ....................................... 192/4 A; 192/9; 192/0.094; 192/3 TR; 192/18 B; 188/161; 180/273; 180/282

[58] Field of Search ................ 192/4 A, 0.09, 9, 18 B, 192/3 TR, 1, 0.094, 3 T; 188/181 C, 181 T, 162, 265, 161; 74/530; 180/273, 282

[56] References Cited

U.S. PATENT DOCUMENTS 4,076,093 2/1978 Mizuno ............................ 192/3 TR
4,093,050 6/1978 Mizuno ............................ 192/3 TR
4,114,738 9/1978 Brown et al. ........................ 192/4 A
4,289,219 9/1981 Csurgay et al. .................... 192/9 X

*Primary Examiner*—George H. Krizmanich
*Attorney, Agent, or Firm*—Stevens, Davis, Miller & Mosher

[57] ABSTRACT

An anti creep braking system for a vehicle. A force transmission member is drivingly coupled to a part of the brake pedal and transmits braking force to a braking force generation system. A braked member is selectively braked by a braking device, and is driven by the brake pedal with a one direction force transmission device being interposed on the path of transmission of force between the brake pedal and the braked member. The sense of force transmission of the one direction force transmission device is such that, when the movement of the braked member with respect to the vehicle is prevented by the braking device, the brake pedal may be further depressed to increase vehicle braking action without transmitting substantial force to the braked member, but may not be moved backwards to reduce vehicle braking action. A control system selectively controls the braking device so as to put it into operation and to release it from operation according to the operational conditions of the vehicle effected by the driver of the vehicle and/or skidding condition of the vehicle.

12 Claims, 7 Drawing Figures

CONTROL SYSTEM

II
10
9
8
11
13
21
16
12
20
2
3
60
22
6
5
4
7
II
1
23
CONTROL SYSTEM 10
9
8
11
21
19
20
15
12
17
16
6
18
13
14
7
22
23
CONTROL SYSTEM

ELECTRO-MAGNETIC BRAKE
13
33
111
114
111a
DRIVER CIRCUIT
120
229
F/F
231
S
R
227
226
COMPARATOR
224
225
COUNTER
228
217
218
221
222
223
COMPARATOR
COMPARATOR
COMPARATOR
23
216
MONOSTABLE MULTIVIBRATOR CIRCUIT
c
b
a
d
219
COUNTER
215
MONOSTABLE MULTIVIBRATOR CIRCUIT
211
220
CLOCK PULSE SIGNAL GENERATING CIRCUIT
200
214a
214
212
213

13
ELECTROMAGNETIC BRAKE
DRIVER CIRCUIT
120
233
23
111
114
111a
229
231
F/F
R
S
224
227
F/F
R
S
228
217
218
COMPARATOR
235
COMPARATOR
236
COMPARATOR
237
COMPARATOR
222
COMPARATOR
223
234
x
y
z
R
MONOSTABLE MULTIVIBRATOR CIRCUIT
216
c
b
MONOSTABLE MULTIVIBRATOR CIRCUIT
215
a
211
COUNTER
219
R
d
CLOCK PULSE SIGNAL GENERATING CIRCUIT
220
200
212
213
214

ANTI CREEP VEHICLE BRAKING SYSTEM ALLOWING FURTHER ADDITIONAL BRAKING ACTION APPLICATION

BACKGROUND OF THE INVENTION

The present invention relates to a vehicle anti creep braking system, and more particularly relates to an anti creep braking system for a vehicle in which the braking effect produced by stepping on a brake pedal of the vehicle is kept applied, in certain circumstances, even after the brake pedal is released.

When an automotive vehicle equipped with an automatic transmission is braked to a temporary halt as during a traffic holdup or in order to wait for a traffic signal, even when the engine of the vehicle is operating at idling engine revolution speed while so halted, if the transmission of the vehicle is left set to a forward driving transmission range such as "D" range or "L" range, there is typically a problem that the vehicle tends to move forwards at a low speed, or to perform so called creeping. This is because typically such a vehicle equipped with an automatic transmission is also equipped with a fluid torque converter which also functions as a fluid clutch, and when such a vehicle is stationary while the engine thereof is rotating said fluid torque converter inevitably drags somewhat, rather than slipping or performing clutch action perfectly. This problem is an inherent one with the use of such a fluid torque converter for such a clutching function; and, in the absence of some effective anti creep system, means that the driver of the vehicle needs to keep his foot pressed on the brake pedal thereof, during such a temporary stopping of the vehicle while it is still left in a forward driving transmission range, in order to prevent the vehicle from moving. This is most inconvenient, and can present a problem with regard to safety.

Accordingly, in order to cope with this problem of creep of a vehicle equipped with an automatic transmission, various anti creep braking systems have been proposed. A typical such system provides a device to automatically keep applied the braking force which was used for stopping the vehicle, without requiring the brake pedal to be kept depressed by the vehicle operator, until it is desired to again move the vehicle away from the rest condition, when said braking force is released. In more detail, such an anti creep braking system generally includes a brake pedal braking device, which for instance may be of an electromagnetic type, and which, when the brake pedal has been used to brake the vehicle to a stop, holds the brake pedal at its depressed position until once again it is required to move the vehicle away from rest. The control of the engagement and of the releasing of such a brake pedal braking device is also known in various forms.

One of the difficulties that arises with regard to the control of such a brake pedal braking device is as follows. If the vehicle is brought to a halt by stepping on the brake pedal so as to bring it to a first depressed position, so that the brake pedal braking device as described above holds the brake pedal at this first depressed position, and then subsequently it is required to depress the brake pedal still further in order to bring it to a second depressed position more depressed than the first depressed position, which for example may be required in order to hold the vehicle on a slope or because of engine idling revolution speed fluctuation, then when the driver of the vehicle pushes again on the brake pedal to further depress it from the abovementioned first depressed position it is required that the brake pedal braking device should not obstruct the further depression of the brake pedal. In the prior art of the abovementioned kind employing an electromagnetic type brake pedal braking device, it has been practiced for an electrical control system which controls the selective supply of actuating electrical energy to the electromagnetic type brake pedal braking device to sense this additional stepping on of the brake pedal, and according thereto to temporarily release said electromagnetic type brake pedal braking device, i.e. to temporarily cease the supply of actuating electrical energy thereto, in order to allow the abovementioned further depression of said brake pedal. Subsequently, naturally, the electrical control system recommences the supply of actuating electrical energy to the electromagnetic type brake pedal braking device, in order to keep the brake pedal fixed at the new second depressed position. However, this complicated form of action required from the electrical control system has made such a control system complicated, with the attendant disadvantages of high cost, high bulk, unreliability, and difficulty in servicing.

A further set of difficulties that have arisen with regard to such a brake pedal braking device are connected with the proper times to supply activating electrical energy to, and to cease said supply of activating electrical energy to, the electromagnetic type brake pedal braking device.

First, with regard to the ceasing of supply of actuating electrical energy to the electromagnetic type brake pedal braking device, it is desirable for a control system which controls such a brake pedal braking device to cease said supply of actuating electrical energy to the electromagnetic type brake pedal braking device, not only when it is desired to move the vehicle away from rest, but when the vehicle is definitely held in place as stationary by some other means than the normal brake pedal activated braking system. This is very helpful for reducing the electrical power consumption of the vehicle during this waiting or rest operational condition, which reduces vehicle fuel consumption and also reduces risk of exhausting the battery thereof, if the waiting condition persists for a considerable time. But, on the other hand, it may not always be safe for the control system to cease said supply of actuating electrical energy to the electromagnetic type brake pedal braking device merely when the vehicle is held in place as stationary by a parking brake system thereof, because a parking brake, when set by the driver of the vehicle, does not become completely set, and accordingly does not necessarily definitely and positively hold the vehicle as stationary. Accordingly, if the anti creep action of retaining of the braking effect of the braking system of the vehicle is released as soon as merely the parking brake thereof is applied, there is a risk that the vehicle may undesirably start to move forwards due to creep of the automatic transmission thereof which is still set to a forward driving range such as "D" range, especially on a sloping road. On the other hand, it would be desirable to cease said supply of actuating electrical energy to the electromagnetic type brake pedal braking device, in circumstances in which it was definitely the case that some braking system other than the brake pedal operated braking system of the vehicle was holding said vehicle and preventing said vehicle from moving forwards. Further, if various sensors are provided for the transmission and for various braking systems of the vehicle, in order to implement the above mentioned requirements, it would be desirable to utilize these sensors also for other functions.

Next, with regard to the starting of supply of actuating electrical energy to the electromagnetic type brake pedal braking device, it is desirable for a control system which controls such a brake pedal braking device to start said supply of actuating electrical energy to the electromagnetic type brake pedal braking device, when it is determined that the vehicle has been braked substantially to rest, and this is typically done by sensing the revolution speed of at least one wheel of the vehicle and, when said revolution speed becomes very low or substantially zero and at the same time the throttle or accelerator pedal of the vehicle is at substantially idling position, commencing said supply of actuating electrical energy to the electromagnetic type brake pedal braking device. However, in this case a problem arises in that, if the vehicle is being braked and said wheel skids, then the revolution speed of said wheel becomes substantially zero quite quickly; and if in this case the braking effect of the braking system of the vehicle is retained there is a risk of locking the vehicle into the skid, i.e. of making it impossible or difficult for the vehicle driver to recover from the skid and stop the vehicle skidding. Since it may well be the actual application of the braking system of the vehicle which caused the vehicle to skid in the first instance, this can be a very important problem.

SUMMARY OF THE INVENTION

Accordingly, it is the primary object of the present invention to provide an anti creep braking system for a vehicle, with the use of which it is possible to step on the brake pedal and to depress it further, freely, after said brake pedal has once been depressed and has been held in its said once depressed place by the anti creep braking system, so as to keep the braking system of the vehicle applied when the vehicle is at rest.

It is a further object of the present invention to provide such an anti creep braking system for a vehicle, wherein the control system for controlling a brake pedal braking device therein is not unduly complicated.

It is a further object of the present invention to provide an anti creep braking system for a vehicle, wherein in such a control system for controlling a brake pedal braking device thereof there is no requirement for a function of releasing the brake pedal temporarily in order to allow it to be further depressed.

It is a further object of the present invention to provide an anti creep braking system for a vehicle, in the operation of which the above described action of holding on the braking action of a brake pedal thereof is released, when it is definitely established that another braking system of the vehicle other than the brake pedal activated brake system thereof is holding the vehicle and is preventing it from moving.

It is a further object of the present invention to provide an anti creep braking system for a vehicle, in the operation of which the above described action of holding on the braking action of a brake pedal thereof is released, when the automatic transmission of the vehicle is put into parking or "P" range.

It is a further object of the present invention to provide an anti creep braking system for a vehicle, in the operation of which the above described action of holding on the braking action of a brake pedal thereof is released, when both the automatic transmission of the vehicle is put into parking or "P" range and also a parking brake of the vehicle is applied or set into engagement.

It is a further object of the present invention to provide such an anti creep braking system for a vehicle as suggested in the last two objects above, in the operation of which the above described action of holding on the braking action of a brake pedal thereof is also released when the accelerator pedal which controls the engine of the vehicle is even slightly depressed from its non depressed position.

It is a further subsidiary object of the present invention to provide such an anti creep braking system for a vehicle as suggested in the penultimate object above, in the operation of which, if the driver of the vehicle leaves the driver's seat thereof without setting the transmission into parking or "P" range, an alarm buzzer is sounded.

It is a further subsidiary object of the present invention to provide such an anti creep braking system for a vehicle as suggested in the penultimate object above, in the operation of which, if the driver of the vehicle leaves the driver's seat thereof without both setting the transmission into parking of "P" range and also setting the parking brake of the vehicle to be engaged, an alarm buzzer is sounded.

It is a further subsidiary object of the present invention to provide such an anti creep braking system for a vehicle as suggested in the above, in the operation of which the sensors used for the transmission and/or the parking brake system therefor are also used for determining when to sound such an alarm buzzer.

It is a further object of the present invention to provide an anti creep braking system for a vehicle, in the operation of which said action of holding on the braking action of a brake pedal thereof is applied, when it is determined that the vehicle is slowing down without skidding.

It is a further object of the present invention to provide an anti creep braking system for a vehicle, in the operation of which said action of holding on the braking action of a brake pedal thereof is applied, when it is determined that the vehicle is slowing down without skidding, by the vehicle speed having remained lower than a predetermined value for a certain road distance without having become zero.

It is a further object of the present invention to provide an anti creep braking system for a vehicle, in the operation of which said action of holding on the braking action of a brake pedal thereof is applied, when it is determined that the vehicle is slowing down without skidding, by the vehicle speed having steadily decreased below a predetermined value for a certain road distance without having become zero.

It is a further object of the present invention to provide an anti creep braking system for a vehicle, in the operation of which said action of holding on the braking action of a brake pedal thereof is applied, when it is determined that the vehicle is slowing down without skidding, by three successively sampled values of the vehicle speed having progressively decreased below a predetermined value without said vehicle road speed having become zero.

It is a further object of the present invention to provide an anti creep braking system for a vehicle, in the operation of which there is no risk of locking the vehicle into a skid.

It is a further object of the present invention to provide an anti creep braking system for a vehicle, in the operation of which vehicle safety is maximized.

It is a further object of the present invention to provide an anti creep braking system for a vehicle, in the operation of which consumption of electrical energy is minimized.

It is a further object of the present invention to provide an anti creep braking system for a vehicle, in the operation of which consumption of fuel by the vehicle is minimized.

It is a further object of the present invention to provide an anti creep braking system for a vehicle, in the operation of which as little danger of exhausting the battery of the vehicle as possible is caused.

It is a further object of the present invention to provide an anti creep braking system for a vehicle, in the operation of which the vehicle is as operationally reliable as possible.

It is a further object of the present invention to provide an anti creep braking system for a vehicle, wherein as many of the essential functions as possible are mechanically implemented.

It is a further object of the present invention to provide such an anti creep braking system for a vehicle, which is as cheap as possible.

It is a further object of the present invention to provide such an anti creep braking system for a vehicle, which is as small in bulk as possible.

It is a further object of the present invention to provide such an anti creep braking system for a vehicle, which is as economical in parts utilization as possible.

It is a further object of the present invention to provide such an anti creep braking system for a vehicle, which is as reliable as possible.

It is a further object of the present invention to provide such an anti creep braking system for a vehicle, which is as easy to service as possible.

According to the present invention, these and other objects are accomplished by an anti creep braking system for a vehicle, comprising: a brake pedal which is movable to and fro with respect to said vehicle, and which is adapted to be impelled in a first direction by a vehicle operator in order to generate braking force; a braking force generation system comprising a force transmission member which is drivingly coupled to a part of said brake pedal, said braking force generation system, when said force transmission member is impelled by said brake pedal moving in said first direction, generating braking force to stop said vehicle, and when said force transmission member is not impelled by said brake pedal moving in said first direction, ceasing to generate said braking force to stop said vehicle; a braked member; a means for transmitting force in one direction only, and not in the reverse direction; a braking device which selectively can prevent the movement of said braked member with respect to said vehicle; and a control system for selectively controlling said braking device so to prevent the movement of said braked member with respect to said vehicle; said braked member being driven by said brake pedal with said one direction force transmission means being interposed on the path of transmission of force between said brake pedal and said braked member, the sense of force transmission of said one direction force transmission means being such that, when the movement of said braked member with respect to said vehicle is prevented by said braking device, said brake pedal may move without transmitting substantial force to said braked member when moved in said first direction which results in increased application of braking force via said force transmission member and said braking force generation system to said vehicle, but so that, when the movement of said braked member with respect to said vehicle is prevented by said braking device, said brake pedal cannot move with respect to said braked member in the direction opposite to said first direction which results in decreased application of braking force via said force transmission member and said braking force generation system to said vehicle.

According to such a structure, when first said brake pedal is moved so as to cause braking force to be applied via said force transmission member and said braking force generation system to said vehicle, and then said braking device is engaged so as to prevent the movement of said braked member with respect to said vehicle while said brake pedal continues to be so moved, thereby said brake pedal cannot move in the direction opposite to said first direction so as to decrease the braking force exerted on said vehicle; but, on the other hand when said brake pedal is desired to move further in the direction to cause further braking force to be applied via said force transmission member and said braking force generation system so as to further brake said vehicle, then such movement is freely possible, without the braking device being required to be released, owing to the above specified sense of operation of the one way force transmission means.

Further, according to a particular aspect of the present invention, these and other objects are more particularly and concretely accomplished by an anti creep braking system for a vehicle as described above, wherein said one direction force transmission means is a one way clutch which is interposed in an intermediate position on the path of transmission of force between said brake pedal and said braked member at which the force between said brake pedal and said braked member is rotational force.

According to such a structure, the one way force transmission device is cheaply, simply, and reliably rotatably embodied by such a one way clutch, which may be of a per se conventional structure.

Further, according to a particular aspect of the present invention, these and other objects are more particularly and concretely accomplished by an anti creep braking system for a vehicle as described above, wherein said brake pedal is rotatably mounted to said vehicle, and wherein said braked member is rotationally driven by said brake pedal with a degree of increase of rotation speed therebetween.

According to such a structure, said braking device obtains a good mechanical advantage, so as more efficiently to prevent the movement of said brake pedal in the direction opposite to said first direction so as to release the braking effect being provided to said vehicle.

Further, according to a particular aspect of the present invention, these and other objects are more particularly and concretely accomplished by an anti creep braking system for a vehicle of any of the sorts described above, said vehicle incorporating an automatic transmission which has a parking range, wherein said control system releases the action of said braking device to brake said braked member, when said transmission of said vehicle is put into said parking range.

According to such a structure, when said transmission is set into said parking range, it is considered that said vehicle is positively prevented from moving and that said anti creep braking system is no longer particularly required to function to stop the vehicle creeping forward, and thus said braking of said brake pedal is released, thus saving energy.

Further, according to an alternative particular aspect of the present invention, these and other objects are more particularly and concretely accomplished by an anti creep braking system for a vehicle of any of the sorts described above, said vehicle incorporating a parking brake and an automatic transmission which has a parking range, wherein said control system releases the action of said braking device to brake said braked member, when both said transmission of said vehicle is put into said parking range and also said parking brake is set to be engaged.

According to such a structure, when said transmission is set into said parking range and also said parking brake is set, it is considered that said vehicle is positively prevented from moving and that said anti creep braking system is no longer particularly required to function to stop the vehicle creeping forward, and thus said braking of said brake pedal is released, thus saving energy.

Further, according to a particular aspect of the present invention, in a case such as either of the two above, there may further be provided an alarm which is sounded when the driver of the vehicle leaves the driver's seat thereof, without setting the transmission of the vehicle into parking range and possibly without also setting the parking brake to be engaged. This provides a guard against such careless behaviour, and may be accomplished by using the same sensors for the transmission range, and for the engagement condition of the parking brake, as were used for the control of the anti creep braking system.

Further, according to a particular aspect of the present invention, these and other objects are more particularly and concretely accomplished by an anti creep braking system for a vehicle of any of the sorts described above, said vehicle further comprising a road wheel and an accelerator pedal, wherein said control system applies the action of said braking device to brake said braked member, when the rotational speed of said road wheel of said vehicle has dropped down to below a certain first predetermined rotational speed and has remained below said first predetermined rotational speed for a certain road distance without becoming substantially zero, and subsequently said rotational speed of said road wheel of said vehicle has slowed down to below a certain second predetermined rotational speed lower than said first predetermined rotational speed, said accelerator pedal not having meanwhile been depressed substantially from the non depressed condition.

According to such a structure, because the action of the braking device is not applied to brake said braked member, unless the rotational speed of said road wheel, while having been low for a certain road distance, is not substantially zero, therefore no risk is run of locking said wheel into a skid, since if said wheel skids its rotational speed drops to zero very quickly.

Further, according to a particular aspect of the present invention, these and other objects are more particularly and concretely accomplished by an anti creep braking system for a vehicle of any of the sorts described above, said vehicle further comprising a road wheel and an accelerator pedal, wherein said control system applies the action of said braking device to brake said braked member, when the rotational speed of said road wheel of said vehicle has dropped down to below a certain first predetermined rotational speed and has, according to some practical criterion, decreased from said first predetermined rotational speed over a certain road distance without becoming substantially zero, and subsequently said rotational speed of said road wheel of said vehicle has slowed down to below a certain second predetermined rotational speed lower than said first predetermined rotational speed, said accelerator pedal not having meanwhile been depressed substantially from the non depressed condition.

According to such a structure, because the action of the braking device is not applied to brake said braked member, unless the rotational speed of said road wheel, while having dropped over a certain road distance, is not substantially zero, therefore again no risk is run of locking said wheel into a skid, since if said wheel skids its rotational speed drops to zero very quickly.

BRIEF DESCRIPTION OF THE DRAWINGS

The present invention will now be shown and described with reference to several preferred embodiments thereof, and with reference to the illustrative drawings. It should be clearly understood, however, that the description of the embodiments, and the drawings, are all of them given purely for the purposes of explanation and exemplification only, and are none of them intended to be limitative of the scope of the present invention in any way, since the scope of the present invention is to be defined solely by the legitimate and proper scope of the appended claims.

In the drawings.

DESCRIPTION OF THE PREFERRED EMBODIMENTS

The present invention will now be described with reference to several preferred embodiments thereof, and with reference to the appended drawings.

THE MECHANICAL CONSTRUCTION OF ALL THE PREFERRED EMBODIMENTS

Figure 1:
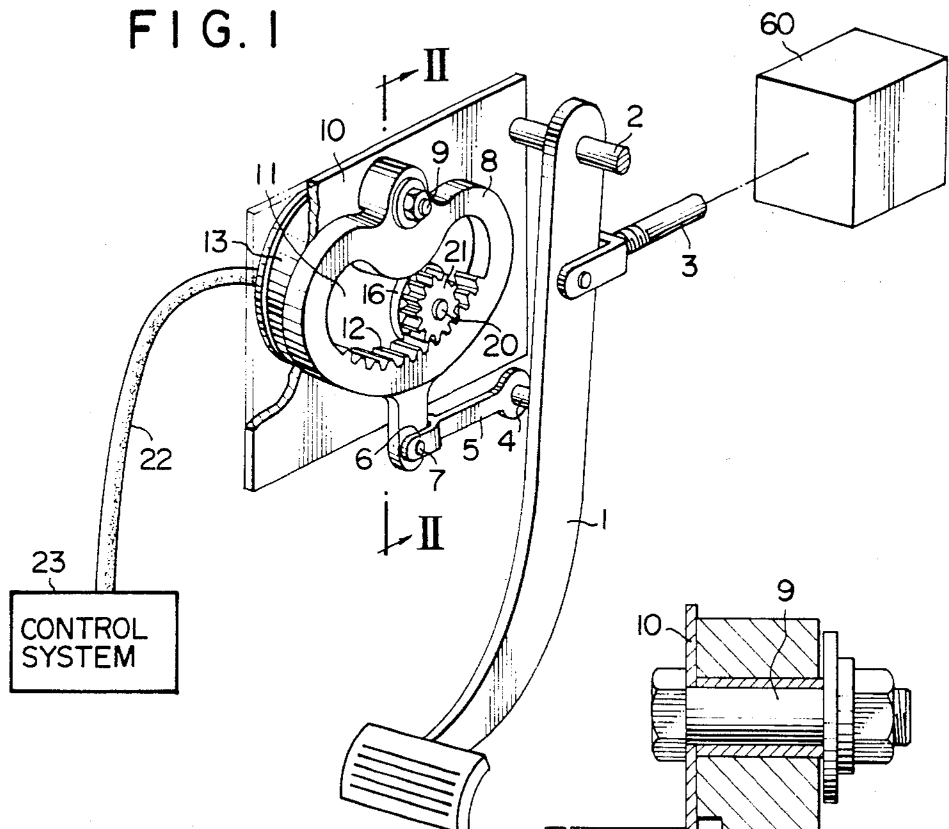
FIG. 1 is a perspective view, in part diagrammatical form, showing a first preferred embodiment of the anti creep braking system according to the present invention.

FIG. 1 is a part perspective part diagrammatical view, showing a first preferred embodiment of the anti creep braking system according to the present invention, and particularly showing the mechanical parts thereof in detail, the control system for said first preferred embodiment being shown as a block in this figure. The reference numeral 1 denotes a brake pedal for applying the brakes of an automotive vehicle, not particularly shown, and this brake pedal 1 is pivoted via a pivot shaft 2 to the body, also not shown, of this automotive vehicle. To a part of the brake pedal 1 substantially closer to the pivot shaft 2 than the brake pad of said brake pedal there is fixed by a yoke member a braking force transmission member 3, which leads in the rightwards direction in the figure to transmit braking force to a per se conventional braking arrangement such as a master cylinder device or the like, diagrammatically shown by a block 60. Accordingly, as the brake pedal 1 is more and more stepped upon, and according to the amount of said stepping on, i.e. according to the amount of rotation of said brake pedal 1 in the anticlockwise direction in FIG. 1, the brakes of the vehicle are applied more and more by said master cylinder device or the like. Further, in a conventional fashion, the master cylinder device or the like, when the brakes are applied, produces more and more application of the brakes of the vehicle, i.e. produces more and more braking effect for the vehicle, according as the force applied to the brake pad of the brake pedal 1 to rotate it in the anticlockwise direction in FIG. 1 is greater and greater.

At an intermediate part of the brake pedal 1 there is fixed a pivot pin 4, to which one end of a connecting link 5 is pivotally mounted. The other end of this connecting link 5 is pivotally connected, via a yoke member 6 formed on it and a pin 7, to a lower (in the figure) protuberance of an internal rack member 8 incorporated in this first embodiment of the anti creep vehicle braking system according to the present invention. And an upper (in the figure) protuberance of this internal rack member 8 is pivoted, via a pivot pin 9, to a bracket member 10 of the braking system which is fixed to the body, not shown, of the automotive vehicle. Thus, as the pad of the brake pedal 1 is alternatively pressed by the foot of a vehicle operator, so that the brake pedal 1 rotates in the anticlockwise direction in FIG. 1, or is released by the foot of the vehice operator, so that said brake pedal 1 rotates (possibly under the biasing action of a return spring, not shown in the figures) in the clockwise direction in FIG. 1, thus according thereto the internal rack member 8 is alternatively rotated in the anticlockwise direction in FIG. 1, or in the clockwise direction in FIG. 1.

Figure 2:
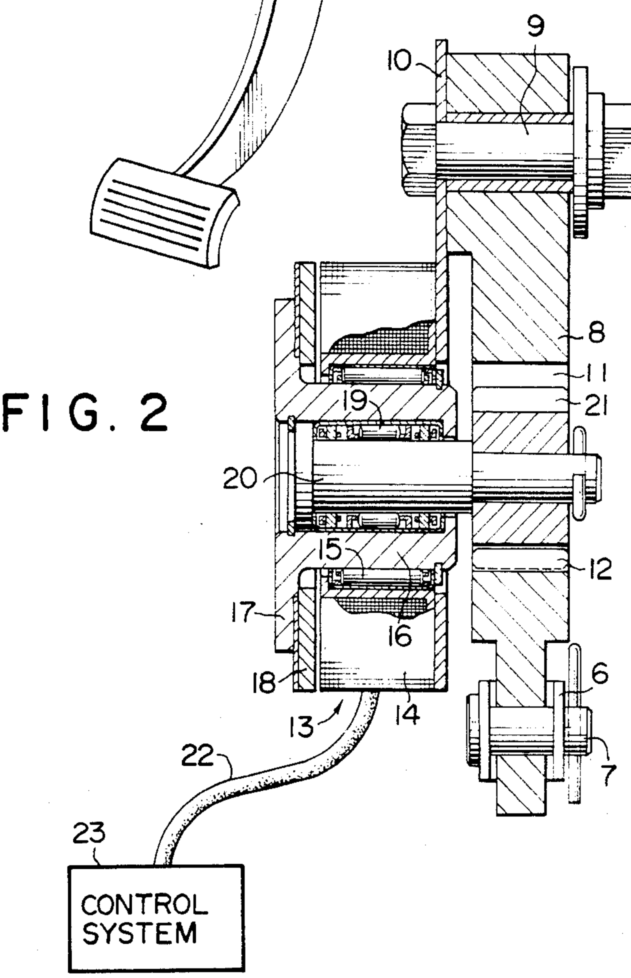
FIG. 2 is a sectional view, also in part diagrammatical form, of said first preferred embodiment of the anti creep braking system according to the present invention, taken along a plane indicated by the lines II—II in FIG. 1, showing the detailed arrangement of a pinion and a rack which mutually drive one another, and also showing a section through an electromagnetic coil, a solenoid, and a one way clutch.

The internal rack member 8 is formed with a curved slot 11, and on the side of this curved slot 11 remote from the pin 9, in this shown first preferred embodiment, there is formed a sector gear or rack 12, which is of the general form of a sector of a circle whose center is the central axis of the pin 9. Within this curved slot 11 and meshing with said sector gear 12, as best seen in FIG. 2 which is a sectional view through the mechanism shown in FIG. 1 taken along a plane shown by the arrows II—II in FIG. 1, there is located a pinion 21, which is fixedly mounted on a pinion shaft 20 which extends in the direction parallel to the mounting shaft 2 of the brake pedal 1 and to the pin 9. Thus, as the pad of the brake pedal 1 is alternatively pressed by the foot of a vehicle operator, so that the brake pedal 1 rotates in the anticlockwise direction in FIG. 1, or is released by the foot of the vehice operator, so that said brake pedal 1 rotates in the clockwise direction in FIG. 1, thus according thereto the pinion 21 and the pinion shaft 20 to which said pinion 21 is fixed are alternatively rotated in the anticlockwise direction in FIG. 1, or in the clockwise direction in FIG. 1.

Referring now particularly to FIG. 2, on the rear of the bracket member 10 from the point of view of FIG. 1, i.e. on the side thereof remote from the sector gear 12, there is fixedly mounted an electromagnetic brake assembly 13 which will now be described. An electromagnetic coil 14 is fixedly mounted to said bracket member 10, and within the cylindrical inner surface of this electromagnetic coil 14 there is disposed a roller bearing 15 which comprises a multitude of needle rollers. Within this needle roller bearing 15 there is supported a sleeve member 16, which can therefore rotate freely within the electromagnetic coil 14 and with respect to the bracket member 10, and which can also move axially to and fro, to the left and the right in FIG. 2, with respect to said electromagnetic coil 14, to a certain extent. The left hand end in the figure of this sleeve member 16 is formed as a disk shaped flange 17, to which there is fixedly attached an armature 18, which in fact is formed as a flat annulus, and which is made of a magnetically attractable material. Thus, according to selective supply of actuating electrical energy to the electromagnetic coil 14: when said electromagnetic coil 14 is not supplied with actuating electrical energy, then said electromagnetic coil 14 does not attract the armature 18, so that said armature 18 and said flange 17 and said sleeve member 16 are free to rotate with respect to said electromagnetic coil 14 and said bracket member 10 on said needle roller bearing 15; or, alternatively, when said electromagnetic coil 14 is supplied with actuating electrical energy, then said electromagnetic coil 14 attracts the armature 18 and squeezes said armature 18 against the body of said electromagnetic coil 14, so that said armature 18 and said flange 17 and said sleeve member 16 are not free to rotate with respect to said electromagnetic coil 14 and said bracket member 10 on said needle roller bearing 15, but are fixed with respect thereto.

Within the inner cylindrical axially extending space of said sleeve member 16 there is mounted, via a one way clutch 19 of a per se conventional sort, the aforesaid pinion shaft 20 to which the aforesaid pinion 21 is fixed. This one way clutch 19 may be a roller clutch or the like, and is constructed and mounted in such a sense that, when the rotation of the sleeve member is fixed by, as explained above, actuating electrical energy being supplied to said electromagnetic coil 14 and said electromagnetic coil 14 attracting the armature 18 and squeezing said armature 18 against the body of said electromagnetic coil 14, so that said armature 18 and said flange 17 and said sleeve member 16 are not free to rotate at all with respect to said electromagnetic coil 14 and said bracket member 10 on said needle roller bearing 15 but are fixed with respect thereto, then the pinion shaft 20 and the pinion 21 fixed thereto are free to move in the anticlockwise direction as seen in FIG. 1, but are not free to move in the clockwise direction as seen in that figure. But, on the other hand, of course when said electromagnetic coil 14 is not being supplied with actuating electrical energy, and thus said electromagnetic coil 14 is not attracting the armature 18, so that said armature 18 and said flange 17 and said sleeve member 16 are free to rotate with respect to said electromagnetic coil 14 and said bracket member 10 on said needle roller bearing 15, then likewise the pinion shaft 20 and the pinion 21 fixed thereto are free to move in the anticlockwise direction as seen in FIG. 1, and are also free to move in the clockwise direction as seen in that figure, i.e. are free to move in either rotational direction, by the rotation of the needle roller bearing 15, irrespective of the functioning of the one way clutch 19.

The electromagnetic coil 14 is selectively supplied with said supply of actuating electrical energy, so as selectively as explained above either to allow the pinion 21 to move in either rotational direction, or to prevent the pinion 21 from moving in the clockwise rotational direction only, from a control system 23, which will be explained in detail with respect to several possible constructions thereof later. For the present, it is only important that the control system 23 supplies actuating electrical energy to the electromagnetic coil 14, so as to prevent the pinion 21 from moving in the clockwise rotational direction only, when the automotive vehicle to which ths braking system is fitted is braked to a halt and kept in a forward driving range of an automatic transmission fitted thereto, such as "D" range, while waiting for a traffic signal or the like.

THE MECHANICAL OPERATION OF ALL THE PREFERRED EMBODIMENTS

Now, the operation of the mechanism shown in FIGS. 1 and 2 and described above will be explained, while treating the control system 23 as a block, since the details of the functioning of said control system 23 will be explained later, with reference to all of the first through fourth preferred embodiments of the anti creep braking system according to the present invention, and its function with respect to promoting anti creep action will be detailed.

First, when the vehicle is moving along a road at a substantial speed, then definitely, according to the functioning of the control system 23 as will be explained later, said control system 23 never supplies electrical current to the electromagnetic coil 14, so that said electromagnetic coil 14 does not attract the armature 18 and does not pull said armature 18 against itself, and thereby said armature 18 and the flange member 17 and the sleeve member 16 formed integrally therewith are free to rotate in either rotational direction with respect to the bracket member 10 and with respect to the body of the automotive vehicle. This means that the pinion 21 and the pinion shaft 20 are also free to rotate in either rotational direction with respect to the bracket member 10 and with respect to the body of the automotive vehicle, and thus said pinion 21 never exerts any substantial force on the internal rack member 8, or on the brake pedal 1. Accordingly, when the operator of the automotive vehicle presses the brake pad of the brake pedal 1 so as to apply the brakes of the vehicle, or when he releases said brake pad of said brake pedal 1 to as to release said braking action, no particular interference is caused with these operations by the anti creep system described above, and the function of the braking system of the vehicle, in this operational mode, is per se well known and conventional.

Now, suppose that the automotive vehicle is going to be braked to rest by the operator thereof. Initially the brake pedal 1 is depressed so as to first brake the vehicle, by the foot of the operator of the vehicle pressing the brake pad of said brake pedal 1, and then said brake pedal 1 rotates in the anticlockwise direction in FIG. 1 about the pivot shaft 2, and thus the braking force transmission member 3 is impelled rightwards in FIG. 1, so as to cause the above mentioned braking system of the vehicle including a brake master cylinder or the like to apply braking effect for the vehicle, in a per se well known way. Now, if the control system 23 decides that the vehicle has been braked to rest—and this decision may be made according to a variety of criteria, as will be explained in detail with respect to the particular functioning of said control system 23 in the various particular embodiments to be described later—then said control system 23 starts to supply electrical current to the electromagnetic coil 14, so that said electromagnetic coil 14 starts to attract the armature 18 and pulls said armature 18 against itself, effectively thereby preventing the rotation of said armature 18 and the flange member 17 and the sleeve member 16 formed integrally therewith, with respect to the bracket member 10 and the body of the automotive vehicle. This means that the pinion 21 and the pinion shaft 20, from their previous conditions in which they were free to move in either rotational direction, are now free to move in the anticlockwise rotational direction with respect to the bracket member 10 and the body of the automotive vehicle, because of the action of the one way clutch 19, but are not free to move in the clockwise rotational direction with respect thereto. At this time, if the operator of the vehicle releases the pressure which he or she is applying to the pad of the brake pedal 1, then, although the braking force transmission member 3 is being impelled in the leftwards direction in FIG. 1 by the reaction of the master cylinder or the like of the braking system of the vehicle, so as to tend to rotate the brake pedal 1 in the clockwise rotational direction in FIG. 1, since such rotation of the brake pedal 1 would, via the link 5 and the internal rack member 8, tend to rotate the pinion 21 in the clockwise rotational direction with respect to the bracket member 10 and the body of the automotive vehicle, therefore such brake releasing movement of said braking force transmission member 3 is positively prevented, as long as the electromagnetic brake 13 continues to be energized by the control system 23. Thus, again as long as the electromagnetic brake 13 continues to be energized by the control system 23, the braking system of the vehicle continues to be held on and applied, so that the vehicle is not allowed to creep forwards while in this stationary condition, even though the operator of said vehicle has released the pressure which he or she is applying to the pad of the brake pedal 1.

Next, when the control system 23 decides that it is appropriate to release the above described anti creep braking effect which is being provided for the vehicle (and this decision will again be explained in detail with respect to the particular functioning of said control system 23 in the various particular embodiments to be described later; for instance, this releasing may be performed when the accelerator pedal of the vehicle is depressed), then said control system 23 ceases supplying electrical current to the electromagnetic coil 14, so that said electromagnetic coil 14 ceases to attract the armature 18 and ceases to pull said armature 18 against itself, ceasing thus to prevent the rotation of said armature 18 and the flange member 17 and the sleeve member 16 formed integrally therewith with respect to the bracket member 10 and the body of the automotive vehicle. This means that the pinion 21 and the pinion shaft 20, from their previous conditions in which they were free to move in the anticlockwise rotational direction with respect to the bracket member 10 and the body of the automotive vehicle, because of the action of the one way clutch 19, but are not free to move in the clockwise rotational direction with respect thereto, are now free to move in either rotational direction. At this time, assuming that the operator of the vehicle has already released the pressure which he or she was previously applying to the pad of the brake pedal 1, then, since the braking force transmission member 3 is being impelled in the leftwards direction in FIG. 1 by the reaction of the master cylinder or the like of the braking system of the vehicle so as to tend to rotate the brake pedal 1 in the clockwise rotational direction in FIG. 1, although such rotation of the brake pedal 1 tends, via the link 5 and the internal rack member 8, to rotate the pinion 21 in the clockwise rotational direction with respect to the bracket member 10 and the body of the automotive vehicle, because now said pinion 21 is free to rotate in this clockwise rotational direction, therefore this brake releasing action is now permitted. Thus, since now the electromagnetic brake 13 has been deenergized by the control system 23, the braking system of the vehicle stops being held on and applied, so that now the vehicle is allowed to move forwards.

On the other hand, if for some reason such as the fact that the vehicle is being held stationary on a slope, or due to wandering in the idling speed of the internal combustion engine of the vehicle, it is desired to apply further braking effect for the vehicle, while the above described anti creep braking effect which is being provided for the vehicle remains provided, i.e. to apply the braking system of the vehicle to a harder extent, then it is only necessary for the operator of the vehicle to further depress the brake pedal 1 in the direction to apply the braking system of the vehicle, i.e. to turn the brake pedal anticlockwise in the sense of FIG. 1, and then as described above via the link 5 the internal rack member 8 will also tend to turn anticlockwise, and this will tend to turn the pinion 21 and the pinion shaft 20 also anticlockwise. No substantial obstacle is presented to this anticlockwise turning by the electromagnetic brake 13, even though at this time said electromagnetic brake 13 is engaged by supply of actuating electrical energy thereto, because of the operation of the one way clutch 19. Of course, when the brake pedal 1 has reached the additionally stepped on position to which it is brought so as to apply said additional braking effect, and is then released by the foot of the vehicle operator being removed, then said brake pedal 1 is retained in its new more stepped on position, by the action of the one way clutch and of the electromagnetic brake 13 which is still engaged.

Thus the particular advantage of the shown construction incorporating the one-way clutch 19 is that additional stepping on of the brake pedal 1 can be performed without releasing the electromagnetic brake 13 by temporarily interrupting the supply of actuating electrical energy thereto, and the brake pedal is automatically retained in this additionally stepped on position. According to this, the control system 23 which selectively supplies said actuating electrical energy for the electromagnetic brake 23 can be made much more simple than has been the case in the prior art, because it is possible to keep the electromagnetic brake always activated, i.e. supplied with actuating electrical energy, when the braking force of the brake pedal 1 is to be retained. Further, this results in an increase in reliability and durability of the braking system, and also reduces its cost and bulk.

Of course, it would be a mere matter of design to rearrange the position of the one way clutch 19 in the path of force transmission between the brake pedal and the electromagnetic brake 13, so that instead of being provided between the pinion shaft 20 and the sleeve member 16 said one way clutch was provided between the pinion 21 and the pinion shaft 20 upon which said pinion 21 would be rotatably fitted, or between the sleeve member 16 and the flange 17 which would be rotatably fitted to said sleeve member 16, or indeed anywhere in the force transmission path between the brake pedal 1 and the member braked by the electromagnetic brake 13. Indeed, actually the principle of the present invention could be implemented without providing the electromagnetic brake 13 as a rotational electromagnetic brake, but by providing a linear brake; and then the counterpart of the one way clutch 19 used in this construction would be a one way movable slider or the like. All these possible variations, and others within the scope of the appended claims, should be understood as falling within the scope of the present invention.

THE CONTROL SYSTEM OF THE FIRST PREFERRED EMBODIMENT

Now, the control system 23 which selectively supplies actuating electrical energy to the electromagnetic coil 14 of the electromagnetic brake 13, in this first preferred embodiment of the anti creep braking system according to the present invention, will be explained. This control system 23 is shown in block diagram form in FIG. 3, along with the electromagnetic brake 13 which is schematically shown by a block. Also shown as a block denoted by the reference numeral 120 is a driver circuit 120 incorporated in said control system 23, which incorporates an electrical power supply starting circuit and an electrical power cutting off circuit, neither of which are particularly shown in the figures.

This electrical power supply starting circuit functions so as to commence the supply of actuating electrical energy to the electromagnetic brake 13, according to various criteria relating to the operating condition of the vehicle which are sensed by various sensors which are not shown in the figure. For example, said electrical power supply starting circuit may start to provide supply of actuating electrical energy to said electromagnetic brake 13 when the rotational speed of a wheel of the vehicle is lower than a certain predetermined speed and additionally the brake pedal of the vehicle is heavily stepped upon. Or, alternatively, said electrical power supply starting circuit may be similar to the relevant parts of the control system of the third preferred embodiment of the braking system according to the present invention shown in FIG. 5, or of the control system of the fourth preferred embodiment of the braking system according to the present invention shown in FIG. 7. In any case, the details of the function of this electrical power supply starting circuit will not be defined or discussed here, since they may in fact be functions as provided by a prior art electrical power providing circuit. The gist of this shown first embodiment of the anti creep braking system according to the present invention relates to the method of releasing the engagement of the electromagnetic brake 13, as will become apparent hereinafter.

The electrical power cutting off circuit within the driver circuit 120 functions so as to cut off the supply of actuating electrical energy to the electromagnetic brake 13, according to the selective supply to said electrical power cutting off circuit of a 1 signal or of a 0 signal, this so called cutoff signal as will be seen later being provided from the output of an OR gate 119. And the rest of the control system 23 shown in FIG. 3, i.e. the part upstream in the control sense of the point where said so called cutoff signal enters the block 120, functions so as to generate this cutoff signal.

This cutoff signal generating part of said control system 23 operates according to the signals from three sensors incorporated therein: an accelerator pedal sensor switch 111, which is open when the accelerator pedal (not shown) which controls the internal combustion engine of the vehicle is not depressed at all, and which is closed when said accelerator pedal is depressed by even a small amount from the non depressed condition; a parking range sensor switch 112 which is closed when the automatic transmission (not shown) of the vehicle is put into parking or "P" range, and which is open when said automatic transmission is put into any range other than said parking or "P" range; and a seat sensor switch 113, which is provided in or near the driver's seat (not shown) in which the driver sits when he is operating the vehicle, and which is closed when a driver is sitting in said driver's seat, while it is open when no driver is sitting in said driver's seat. One terminal of each one of the accelerator pedal sensor switch 111, the parking range sensor switch 112, and the seat sensor switch 113 is connected to ground, and the other terminal 111*a* of the accelerator pedal sensor switch 111 is connected via a resistive element 114 to a power source such as the battery of the vehicle, the other terminal 112*a* of the parking range sensor switch 112 is connected via a resistive element 115 to said power source, and the other terminal 113*a* of the seat sensor switch 113 is similarly connected via a resistive element 116 to said power source. Thus, the voltage signal present at said other terminal 111*a* of said accelerator pedal sensor switch 111 is a 1 or 0 signal (taking ground potential as a 0 signal) indicating respectively whether said accelerator pedal sensor switch 111 is open or closed, i.e. respectively whether the acclerator pedal which controls the internal combustion engine of the vehicle is not depressed at all, or is depressed by even a small amount from the non depressed condition; the voltage signal present at said other terminal 112*a* of said parking range sensor switch 112 is a 1 or 0 signal indicating respectively whether said parking range sensor switch 112 is open or closed, i.e. respectively whether the automatic transmission of the vehicle is put into a range other than said parking or "P" range, or is put into parking or "P" range; and the voltage signal present at said other terminal 113*a* of said seat sensor switch 113 is a 1 or 0 signal indicating respectively whether said seat sensor switch 113 is open or closed, i.e. respectively whether no driver is sitting in said driver's seat, or a driver is sitting in said driver's seat.

Said other terminal 111*a* of said accelerator pedal sensor switch 111 is connected to the input of a NOT gate 117, and said said other terminal 112*a* of said parking range sensor switch 112 is connected to the input of another NOT gate 118, and is also connected to one input of an AND gate 121, the other input of which is fed from said other terminal 113*a* of said seat sensor switch 113. The outputs of the two NOT gates 117 and 118 are connected to the two inputs of the previously mentioned OR gate 119, the output of which is, as stated before, fed to the electrical power cutting off circuit included within the driver circuit 120 as said cutoff signal. And the output of said AND gate 121 is connected to an alarm buzzer 122, which produces a loud warning sound when it is fed with a 1 signal, but which produces no sound as long as it is fed with a 0 signal.

THE OPERATION OF THE CONTROL SYSTEM OF THE FIRST PREFERRED EMBODIMENT

The control system of the first preferred embodiment of the anti creep braking system according to the present invention whose structure is described above operates as follows.

First, when the vehicle is braked to a halt, as previously described, the aforesaid electrical power supply starting circuit not particularly shown in the figure causes the driver circuit 120 to start to supply power to the electromagnetic brake 13, thus causing said electromagnetic brake 13 to be engaged and, as described above with respect to the mechanical structure of the anti creep braking system according to the present invention, causing said braking system to operate in its anti creep mode, wherein the stepping on of the brake pedal 1 is not released, even if the driver releases said brake pedal 1 with his or her foot, and wherein further if the brake pedal 1 is further depressed by the foot of the driver then said further depression is freely allowed to be applied, and is likewise held. This brake retaining action is continued while the accelerator pedal which controls the internal combustion engine of the vehicle remains as not depressed at all, and while the automatic transmission of the vehicle remains in any range other than parking or "P" range; i.e., while the accelerator pedal sensor switch 111 continues to be open and also the parking range sensor switch 112 continues to be also open. At this time there is present a 1 signal at the terminal 111*a* of the accelerator pedal sensor switch 111 and at the input of the NOT gate 117, and thus there is present a 0 signal at the output of the NOT gate 117; and also there is present a 1 signal at the terminal 112*a* of the parking range sensor switch 112 and at the input of the NOT gate 118, and thus there is present a 0 signal at the output of the NOT gate 118. Thus, both the inputs of the OR gate 119 are 0 signals, and hence its output is a 0 signal, and the driver circuit 120 is not caused to cease to supply power to the electromagnetic brake 13, thus causing said electromagnetic brake 13 to be kept engaged.

On the other hand, if the accelerator pedal which controls the internal combustion engine of the vehicle is depressed even slightly from its non depressed position, this obviously indicates a desire on the part of the vehicle operator to move away from the stationary vehicle operational condition, and at this time the accelerator pedal sensor switch 111 comes to be closed from previously being open. This means that a 0 signal comes to be present at the terminal 111*a* of the accelerator pedal sensor switch 111 and at the input of the NOT gate 117, and thus there is now present a 1 signal at the output of the NOT gate 117. Accordingly, although still there is present a 1 signal at the terminal 112*a* of the parking range sensor switch 112 and at the input of the NOT gate 118, and although still thus there is present a 0 signal at the output of the NOT gate 118, because one of the input signals to the OR gate 119 has now become a 1 signal, irrespective of the input signal at its other input the OR gate 119 now outputs a 1 signal to the driver circuit 120, which as explained above causes the electrical power cutting off circuit within the driver circuit 120 to function so as to cut off the supply of actuating electrical energy to the electromagnetic brake 13. This as explained above causes the electromagnetic brake 13 to release the rotational fixing of the flange member 17 which it was previously causing, thus allowing the brake pedal 1 to rotate in the clockwise direction as seen in FIG. 1 and allowing the braking effect provided by the braking system to the vehicle to be released. Accordingly the vehicle is now free to be moved away from rest, according to the depression of the accelerator pedal thereof by the driver.

On the other hand, if the transmission of the vehicle is put into the "P" or parking range while the vehicle is thus stationary, from being not in said "P" or parking range, then this obviously indicates a desire on the part of the vehicle operator not (at any rate immediately) to move away from the stationary vehicle operational condition; but, since the locking up of a transmission of a typical sort on shifting it into the "P" or parking range is very reliable, and since the braking effect of such transmission locking is absolute or at least very strong, according to the principle of this particular first preferred embodiment it is considered that the holding on of the braking system is no longer now required. At this time the parking range sensor switch 112 comes to be closed from previously being open, and this means that a 0 signal comes to be present at the terminal 112*a* of the parking range sensor switch 112 and at the input of the NOT gate 118, and thus there is now present a 1 signal at the output of the NOT gate 118. Accordingly, although still there is present a 1 signal at the terminal 111*a* of the accelerator pedal sensor switch 111 and at the input of the NOT gate 117, and although still thus there is present a 0 signal at the output of the NOT gate 117, because one of the input signals to the OR gate 119 has now become a 1 signal, the OR gate 119 now outputs a 1 signal to the driver circuit 120, which is explained above, similarly to the previous case, causes the electrical power cutting off circuit within the driver circuit 120 to function so as to cut off the supply of actuating electrical energy to the electromagnetic brake 13. This as explained above causes the electromagnetic brake 13 to release the rotational fixing of the flange member 17 which it was previously causing, thus allowing the brake pedal 1 to rotate in the clockwise direction as seen in FIG. 1 and allowing the braking effect provided by the braking system to the vehicle to be released. Accordingly the braking system of the vehicle is now unlocked, since the vehicle in any case cannot be moved away from rest, due to the locking of the transmission thereof.

This unlocking of the braking system of the vehicle is clearly very helpful from the point of view of minimizing consumption of electrical power during the time period when the vehicle is waiting, before being moved away, because in fact an electromagnetic brake such as the electromagnetic brake 13 typically uses quite a lot of power. Not only does this economy of electrical power mean that the fuel consumption of the vehicle is improved—an important consideration—but also it means that the risk of the battery of the vehicle becoming exhausted during a prolonged period of waiting, as during congested traffic, is much reduced. This is a very important operational consideration with regard to the reliability of a vehicle in actual use.

At any time during this operation of the vehicle, because as a matter of course the driver of the vehicle is sitting in the driver's seat thereof during vehicle operation, therefore the seat sensor switch 113 is closed, and thus there is present a 0 signal at the terminal 113*a* of said seat sensor switch 113 and at one of the inputs of the AND gate 121, and accordingly whatever be the value at the other input of this AND gate 121 its output is a 0 signal, and accordingly the alarm buzzer 122 is never sounded. Further, if the vehicle is put by the driver thereof into "P" or parking range and then the driver leaves the driver's seat subsequently, as is proper, then first the parking range sensor switch 112 will come to be closed from being open, thus causing a 0 signal to be present at the terminal 112*a* of said parking range sensor switch 112 and at said other input of the AND gate 121, and although subsequently when the driver leaves the driver's seat a 1 signal will come to be present at the terminal 113*a* of the seat sensor switch 113 and at said one input of the AND gate 121, accordingly whatever be the value at said other input of this AND gate 121 its output is a 0 signal, and accordingly the alarm buzzer 122 is never sounded. On the other hand, a particular subsidiary feature of this first preferred embodiment of the anti creep braking system according to the present invention is that if the driver of the vehicle negligently leaves the driver's seat without engaging the automatic transmission to the "P" or parking range then the seat sensor switch 113 will come to be open from being closed, while the parking range sensor switch 112 is also still open; and at this time there thus comes to be present a 1 signal at the terminal 113*a* of the seat sensor switch 113 and at said one of the inputs of the AND gate 121, and also there is present a 1 signal at the terminal 112*a* of the parking range sensor switch 112 and at said other input of the AND gate 121. Thus, both the inputs of the AND gate 121 are supplied with 1 signals, and hence its output is a 1 signal, and the alarm buzzer 122 is sounded, thus alerting the driver of the vehicle to his or her careless mistake in leaving the vehicle without engaging "P" or parking range.

THE SECOND PREFERRED EMBODIMENT

Figure 3:
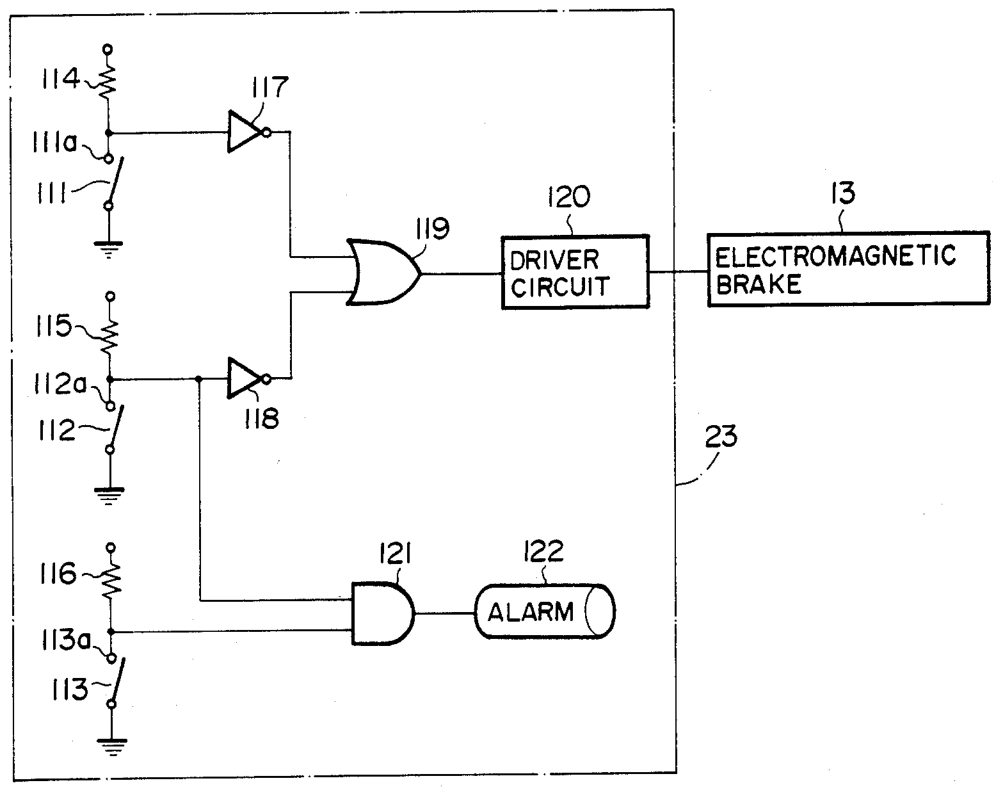
FIG. 3 is a schematic circuit diagram, showing the construction, in the first preferred embodiment of the anti creep braking system according to the present invention, of a control system which is shown in FIG. 2 by a block.
Figure 4:
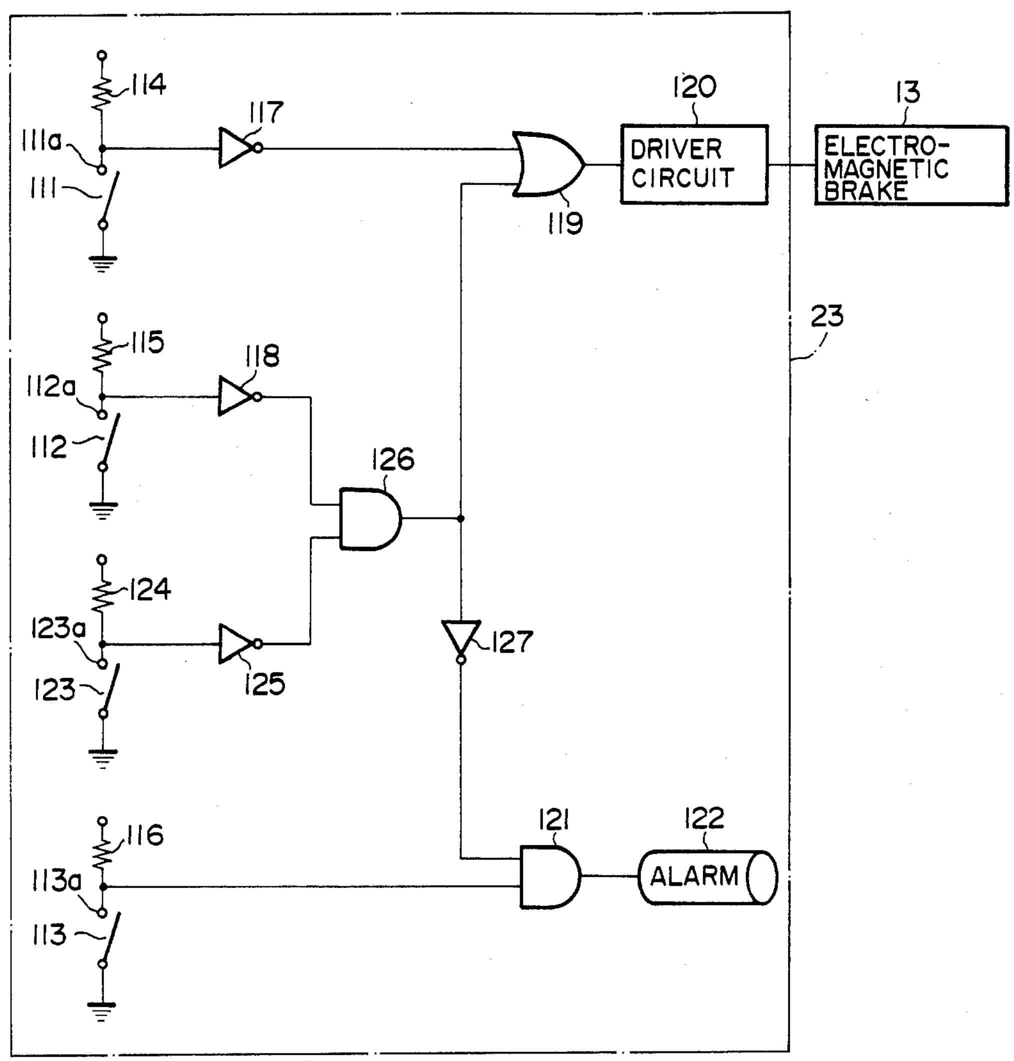
FIG. 4 is a schematic circuit diagram, similar to FIG. 3, showing the construction, in a second preferred embodiment of the anti creep braking system according to the present invention which is otherwise the same as the first preferred embodiment thereof shown in FIGS. 1 and 2, of said control system which is shown in FIG. 2 by a block.

In FIG. 4, there is shown the control system 23 used in a second preferred embodiment of the braking system according to the present invention, in a fashion similar to FIG. 3. In FIG. 4, parts of the second preferred embodiment shown, which correspond to parts of the first preferred embodiment shown in FIGS. 1, 2, and 3, and which have the same functions, are designated by the same reference numerals and symbols as in those figures.

THE CONTROL SYSTEM OF THE SECOND PREFERRED EMBODIMENT

Now, the control system 23 which selectively supplies actuating electrical energy to the electromagnetic coil 14 of the electromagnetic brake 13, in this second preferred embodiment of the anti creep braking system according to the present invention, will be explained. This control system 23 is shown in block diagram form in FIG. 4, along with the electromagnetic brake 13 which is schematically shown by a block. Also shown as a block denoted by the reference numeral 120 is a driver circuit 120 incorporated in said control system 23, similar to the driver circuit of the first preferred embodiment shown in FIG. 3, which incorporates an electrical power supply starting circuit and an electrical power cutting off circuit, neither of which are particularly shown in the figures.

Again, this electrical power supply starting circuit functions so as to commence the supply of actuating electrical energy to the electromagnetic brake 13, according to various criteria relating to the operating condition of the vehicle which are sensed by various sensors which are not shown in the figure. For example, said electrical power supply starting circuit may start to provide supply of actuating electrical energy to said electromagnetic brake 13 when the rotational speed of a wheel of the vehicle is lower than a certain predetermined speed and additionally the brake pedal of the vehicle is heavily stepped upon. Or, alternatively, said electrical power supply starting circuit may be similar to the relevant parts of the control system of the third preferred embodiment of the braking system according to the present invention shown in FIG. 5, or of the control system of the fourth preferred embodiment of the braking system according to the present invention shown in FIG. 7. In any case, the details of the function of this electrical power supply starting circuit will not be defined or discussed hwere, since they may in fact be functions as provided by a prior art electrical power providing circuit. The gist of this shown second preferred embodiment of the anti creep braking system according to the present invention relates to the method of releasing the engagement of the electromagnetic brake 13, as will become apparent hereinafter.

The electrical power cutting off circuit within the driver circuit 120 again functions so as to cut off the supply of actuating electrical energy to the electromagnetic brake 13, according to the selective supply to said electrical power cutting off circuit of a 1 signal or of a 0 signal, this so called cutoff signal as will be seen later again being provided from the output of an OR gate 119. And the rest of the control system 23 shown in FIG. 4, i.e. the part upstream in the control sense of the point where said so called cutoff signal enters the block 120, functions so as to generate this cutoff signal.

This cutoff signal generating part of said control system 23 operates according to the signals from four sensors incorporated therein: an accelerator pedal sensor switch 111, which is open when the accelerator pedal (not shown) which controls the internal combustion engine of the vehicle is not depressed at all, and which is closed when said accelerator pedal is depressed by even a small amount from the non depressed condition; a parking range sensor switch 112 which is closed when the automatic transmission (not shown) of the vehicle is put into parking or "P" range, and which is open when said automatic transmission is put into any range other than said parking or "P" range; a parking brake sensor switch 123, which is provided to the parking brake (not shown) of the vehicle, and which is closed when said parking brake is set on so as to hold the vehicle stationary, while it is open when said parking brake is not set on; and a seat sensor switch 113, which is provided in or near the driver's seat (not shown) in which the driver sits when he is operating the vehicle, and which is closed when a driver is sitting in said driver's seat, while it is open when no driver is sitting in said driver's seat. Thus this second preferred embodiment of the braking system according to the present invention differs form the first preferred embodiment in that the parking brake sensor switch 123 is provided. One terminal of each one of the accelerator pedal sensor switch 111, the parking range sensor switch 112, the parking brake sensor switch 123, and the seat sensor switch 113 is connected to ground, and the other terminal **111*a* of the accelerator pedal sensor switch 111 is connected via a resistive element 114 to a power source such as the battery of the vehicle, the other terminal 112*a* of the parking range sensor switch 112 is connected via a resistive element 115 to said power source, the other terminal 123*a* of the parking range sensor switch 123 is connected via a resistive element 124 to said power source, and the other terminal 113*a* of the seat sensor switch 113 is similarly connected via a resistive element 116 to said power source. Thus, the voltage signal present at said other terminal 111*a* of said accelerator pedal sensor switch 111 is a 1 or 0 signal (taking ground potential as a 0 signal) indicating respectively whether said accelerator pedal sensor switch 111 is open or closed, i.e. respectively whether the accelerator pedal which controls the internal combustion engine of the vehicle is not depressed at all, or is depressed by even a small amount from the non depressed condition; the voltage signal present at said other terminal 112*a* of said parking range sensor switch 112 is a 1 or 0 signal indicating respectively whether said parking range sensor switch 112 is open or closed, i.e. respectively whether the automatic transmission of the vehicle is put into a range other than said parking or "P" range, or is put into parking or "P" range; the voltage signal present at said other terminal 123*a* of said parking brake sensor switch 123 is a 1 or 0 signal indicating respectively whether said parking brake sensor switch 123 is open or closed, i.e. respectively whether said parking brake is not set on so as to hold the vehicle stationary, or is so set; and the voltage signal present at said other terminal 113*a* of said seat sensor switch 113 is a 1 or 0 signal indicating respectively whether said seat sensor switch 113** is open or closed, i.e. respectively whether no driver is sitting in said driver's seat, or a driver is sitting in said driver's seat.

Said other terminal **111*a* of said accelerator pedal sensor switch 111 is connected to the input of a NOT gate 117, whose output is connected to one of the inputs of the previously mentioned OR gate 119. Said other terminal 112*a* of said parking range sensor switch 112 is connected to the input of another NOT gate 118, and said other terminal 123*a* of said parking brake sensor switch 123 is connected to the input of a third NOT gate 125. The outputs of the NOT gate 118 and the NOT gate 125 are fed to an AND gate 126, whose output is connected to the other input of the previously mentioned OR gate 119, the output of which as stated before is fed to the electrical power cutting off circuit included within the driver circuit 120 as said cutoff signal. And the output of the AND gate 126 is also connected to the input of another NOT gate 127, the output of which is fed to one input of an AND gate 121, the other input of which is fed from said other terminal 113***a* of said seat sensor switch 113. And the output of said AND gate 121 is connected to an alarm buzzer 122, which produces a loud warning sound when it is fed with a 1 signal, but which produces no sound as long as it is fed with a 0 signal.

THE OPERATION OF THE CONTROL SYSTEM OF THE SECOND PREFERRED EMBODIMENT

The control system of the second preferred embodiment of the anti creep braking system according to the present invention whose structure is described above operates as follows.

First, when the vehicle is braked to a halt, as previously described, the aforesaid electrical power supply starting circuit not particularly shown in the figure causes the driver circuit 120 to start to supply power to the electromagnetic brake 13, thus causing said electromagetic brake 13 to be engaged and, as described above with respect to the first preferred embodiment of the anti creep braking system according to the present invention, and with respect to the mechanical structure shown in FIGS. 1 and 2, causing said braking system to operate in its anti creep mode, wherein the stepping on of the brake pedal 1 is not released, even if the driver releases said brake pedal 1 with his or her foot, and wherein further if the brake pedal 1 is further depressed by the foot of the driver then said further depression is freely allowed to be applied, and is likewise held. This brake retaining action is continued while the accelerator pedal which controls the internal combustion engine of the vehicle remains as not depressed at all, and while either the automatic transmission of the vehicle remains in any range other than parking or "P" range or the parking brake remains unset; i.e., while the accelerator pedal sensor switch 111 continues to be open and also either the parking range sensor switch 112 continues to be also open or the parking brake sensor switch 123 continues to be also open. At this time there is present a 1 signal at the terminal 111*a* of the accelerator pedal sensor switch 111 and at the input of the NOT gate 117, and thus there is present a 0 signal at the output of the NOT gate 117; and also either there is present a 1 signal at the terminal 112*a* of the parking range sensor switch 112 and at the input of the NOT gate 118, and thus there is present a 0 signal at the output of the NOT gate 118, or there is present a 1 signal at the terminal 123*a* of the parking range sensor switch 123 and at the input of the NOT gate 125, and thus there is present a 0 signal at the output of the NOT gate 125; in either of which latter cases at least one of the inputs of the AND gate 126 is a 0 signal, and thus the output of the AND gate 126 is a 0 signal. Thus, both the inputs of the OR gate 119 are 0 signals, and hence its output is a 0 signal, and the driver circuit 120 is not caused to cease to supply power to the electromagnetic brake 13, thus causing said electromagetic brake 13 to be kept engaged.

On the other hand, if the accelerator pedal which controls the internal combustion engine of the vehicle is depressed even slightly from its non depressed position, this obviously indicates a desire on the part of the vehicle operator to move away from the stationary vehicle operational condition, and at this time the accelerator pedal sensor switch 111 comes to be closed from previously being open. This means that a 0 signal comes to be present at the terminal 111*a* of the accelerator pedal sensor switch 111 and at the input of the NOT gate 117, and thus there is now present a 1 signal at the output of the NOT gate 117. Accordingly, although still there is present a 1 signal at the terminal 112*a* of the parking range sensor switch 112 and at the input of the NOT gate 118, and although still thus there is present a 0 signal at the output of the NOT gate 118, because one of the input signals to the OR gate 119 has now become a 1 signal, irrespective of the input signal at its other input the OR gate 119 now outputs a 1 signal to the driver circuit 120, which as explained above causes the electrical power cutting off circuit within the driver circuit 120 to function so as to cut off the supply of actuating electrical energy to the electromagnetic brake 13. This as explained previously causes the electromagnetic brake 13 to release the rotational fixing of the flange member 17 which it was previously causing, thus allowing the brake pedal 1 to rotate in the clockwise direction as seen in FIG. 1 and allowing the braking effect provided by the braking system to the vehicle to be released. Accordingly the vehicle is now free to be moved away from rest, according to the depression of the accelerator pedal thereof by the driver.

On the other hand, if the transmission of the vehicle is put into the "P" or parking range while the vehicle is thus stationary, from being not in said "P" or parking range, and if also the parking brake of the vehicle is set to be engaged, then this obviously indicates a desire on the part of the vehicle operator not (at any rate immediately) to move away from the stationary vehicle operational condition; and, since the locking up of a transmission of a typical sort on shifting it into the "P" or parking range is very reliable, and since the braking effect of such transmission locking is absolute or at least very strong, and since also the parking brake is set to be engaged at this time, according to the principle of this particular second preferred embodiment it is considered that the holding on of the braking system is no longer now required. At this time the parking range sensor switch 112 comes to be closed from previously being open, and also the parking brake sensor switch 123 comes to be closed from previously being open; and this means that a 0 signal comes to be present at the terminal 112*a* of the parking range sensor switch 112 and at the input of the NOT gate 118, and thus there is now present a 1 signal at the output of the NOT gate 118, and also that a 0 signal comes to be present at the terminal 123*a* of the parking range sensor switch 123 and at the input of the NOT gate 125, and thus there is now present a 1 signal at the output of the NOT gate 125. Thus, since both of the inputs of the AND gate 126 are 1 signals, the output of the AND gate 126 is a 1 signal. Accordingly, although still there is present a 1 signal at the terminal 111*a* of the accelerator pedal sensor switch 111 and at the input of the NOT gate 117, and although still thus there is present a 0 signal at the output of the NOT gate 117, because one of the input signals to the OR gate 119 (i.e. the output signal of the AND gate 126) has now become a 1 signal, the OR gate 119 now outputs a 1 signal to the driver circuit 120, which as explained above, similarly to the previous case, causes the electrical power cutting off circuit within the driver circuit 120 to function so as to cut off the supply of actuating electrical energy to the electromagnetic brake 13. This as explained above causes the electromagnetic brake 13 to release the rotational fixing of the flange member 17 which it was previously causing, thus allowing the brake pedal 1 to rotate in the clockwise direction as seen in FIG. 1 and allowing the braking effect provided by the braking system to the vehicle to be released. Accordingly the braking system of the vehicle is now unlocked, since the vehicle in any case cannot be moved away from rest, due to the locking of the transmission thereof, and due to the setting of the parking brake thereof.

This unlocking of the braking system of the vehicle is clearly very helpful from the point of view of minimizing consumption of electrical power during the time period when the vehicle is waiting, before being moved away, because in fact an electromagnetic brake such as the electromagnetic brake 13 typically uses quite a lot of power. Not only does this economy of electrical power mean that the fuel consumption of the vehicle is improved—an important consideration—but also it means that the risk of the battery of the vehicle becoming exhausted during a prolonged period of waiting, as during congested traffic, is much reduced. This is a very important operational consideration with regard to the reliability of a vehicle in actual use.

If, on the other hand, either the transmission of the vehicle is put into the "P" or parking range while the vehicle is thus stationary, from being not in said "P" or parking range, but meanwhile the parking brake of the vehicle is not set to be engaged, or alternatively while the vehicle is thus stationary the parking brake of the vehicle is set to be engaged, while meanwhile however the transmission of the vehicle is not put into the "P" or parking range from being not in said "P" or parking range, then according to the logic of this particular second preferred embodiment it is considered that this does not obviously and unequivocally indicate a desire on the part of the vehicle operator not to move away from the stationary vehicle operational condition; and, although the locking up of a transmission of a typical sort on shifting it into the "P" or parking range is very reliable, and although the braking effect of such transmission locking is absolute or at least very strong, and although also the setting of the parking brake is quite effective for preventing the vehicle from moving, according to the principle of this particular second preferred embodiment it is not considered that the holding on of the braking system is no longer now required, unless as in the previously outlined case above both of these two vehicle securing actions are carried out simultaneously. At this time either the parking range sensor switch 112 comes to be closed from previously being open, or alternatively the parking brake sensor switch 123 comes to be closed from previously being open, but not both; and this means that either a 0 signal comes to be present at the terminal 112*a* of the parking range sensor switch 112 and at the input of the NOT gate 118, and thus there is now present a 1 signal at the output of the NOT gate 118, or alternatively that a 0 signal comes to be present at the terminal 123*a* of the parking range sensor switch 123 and at the input of the NOT gate 125, and thus there is now present a 1 signal at the output of the NOT gate 125, but not both. Thus, since only one of the inputs of the AND gate 126 is a 1 signal, the output of the AND gate 126 is a 0 signal. Accordingly, since still there is present a 1 signal at the terminal 111*a* of the accelerator pedal sensor switch 111 and at the input of the NOT gate 117, and since still thus there is present a 0 signal at the output of the NOT gate 117, because neither of the input signals to the OR gate 119 (i.e. the output signal of the AND gate 126) has become a 1 signal, the OR gate 119 continues to output a 0 signal to the driver circuit 120, and thus the electrical power cutting off circuit within the driver circuit 120 is not caused to function so as to cut off the supply of actuating electrical energy to the electromagnetic brake 13. Thus the brake pedal 1 is not allowed to rotate in the clockwise direction as seen in FIG. 1 and the braking effect provided by the braking system to the vehicle is not released. Accordingly the braking system of the vehicle is not unlocked, since it is not considered that it is assured that the vehicle cannot be moved away from rest due to either one alone of the locking of the transmission thereof, or the setting of the parking brake thereof.

At any time during this operation of the vehicle, because as a matter of course the driver of the vehicle is sitting in the driver's seat thereof during vehicle operation, therefore the seat sensor switch 113 is closed, and thus there is present a 0 signal at the terminal 113*a* of said seat sensor switch 113 and at one of the inputs of the AND gate 121, and accordingly whatever be the value at the other input of this AND gate 121 its output is a 0 signal, and accordingly the alarm buzzer 122 is never sounded. Further, if the vehicle is put by the driver thereof into "P" or parking range and also the parking brake thereof is set to be engaged, and then the driver leaves the driver's seat subsequently, as is proper, then first the parking range sensor switch 112 will come to be closed from being open, thus causing a 0 signal to be present at the terminal 112*a* of said parking range sensor switch 112 and at the input of the NOT gate 118, thus causing a 1 signal to be present at the output of said NOT gate 118 and at one input of the AND gate 126, and also the parking brake sensor switch 123 will come to be closed from being open, thus causing a 0 signal to be present at the terminal 123*a* of said parking range sensor switch 123 and at the input of the NOT gate 125, thus causing a 1 signal to be present at the output of said NOT gate 125 and at the other input of the AND gate 126, and thus a 1 signal is present at the output of the AND gate 126 and at the input of the NOT gate 127, and thus a 0 signal is present at the output of the NOT gate 127 and at said other input of the AND gate 121, and thus although subsequently when the driver leaves the driver's seat a 1 signal will come to be present at the terminal 113*a* of the seat sensor switch 113 and at said one input of the AND gate 121, accordingly whatever be the value at said other input of this AND gate 121 its output is a 0 signal, and accordingly the alarm buzzer 122 is never sounded. On the other hand, a particular subsidiary feature of this second preferred embodiment of the anti creep braking system according to the present invention is that, if the driver of the vehicle negligently leaves the driver's seat without both engaging the automatic transmission to the "P" or parking range and also engaging the parking brake of the vehicle, then the seat sensor switch 113 will come to be open from being closed, while either the parking range sensor switch 112 is still open or the parking brake sensor switch 123 is still open; and at this time there thus comes to be present a 1 signal at the terminal 113*a* of the seat sensor switch 113 which is sent to said other input of the AND gate 121, and there comes to be present a 1 signal either at the input of the NOT gate 118 or at the input of the NOT gate 126, and accordingly at least one of the output of said NOT gate 118 and the output of said NOT gate 126 will be a 0 signal, and accordingly at least one of the inputs of the AND gate 126 will be a 0 signal. Hence the output of the AND gate 126 will be a 0 signal which is supplied to the NOT gate 127, and hence the output of said NOT gate 127 will be a 1 signal which is supplied to said one of the inputs of the AND gate 121. Thus, both the inputs of the AND gate 121 are supplied with 1 signals, and hence its output is a 1 signal, and the alarm buzzer 122 is sounded, thus alerting the driver of the vehicle to his or her careless mistake in leaving the vehicle without both engaging "P" or parking range and also setting the parking brake of the vehicle.

THE THIRD PREFERRED EMBODIMENT

Figure 5:
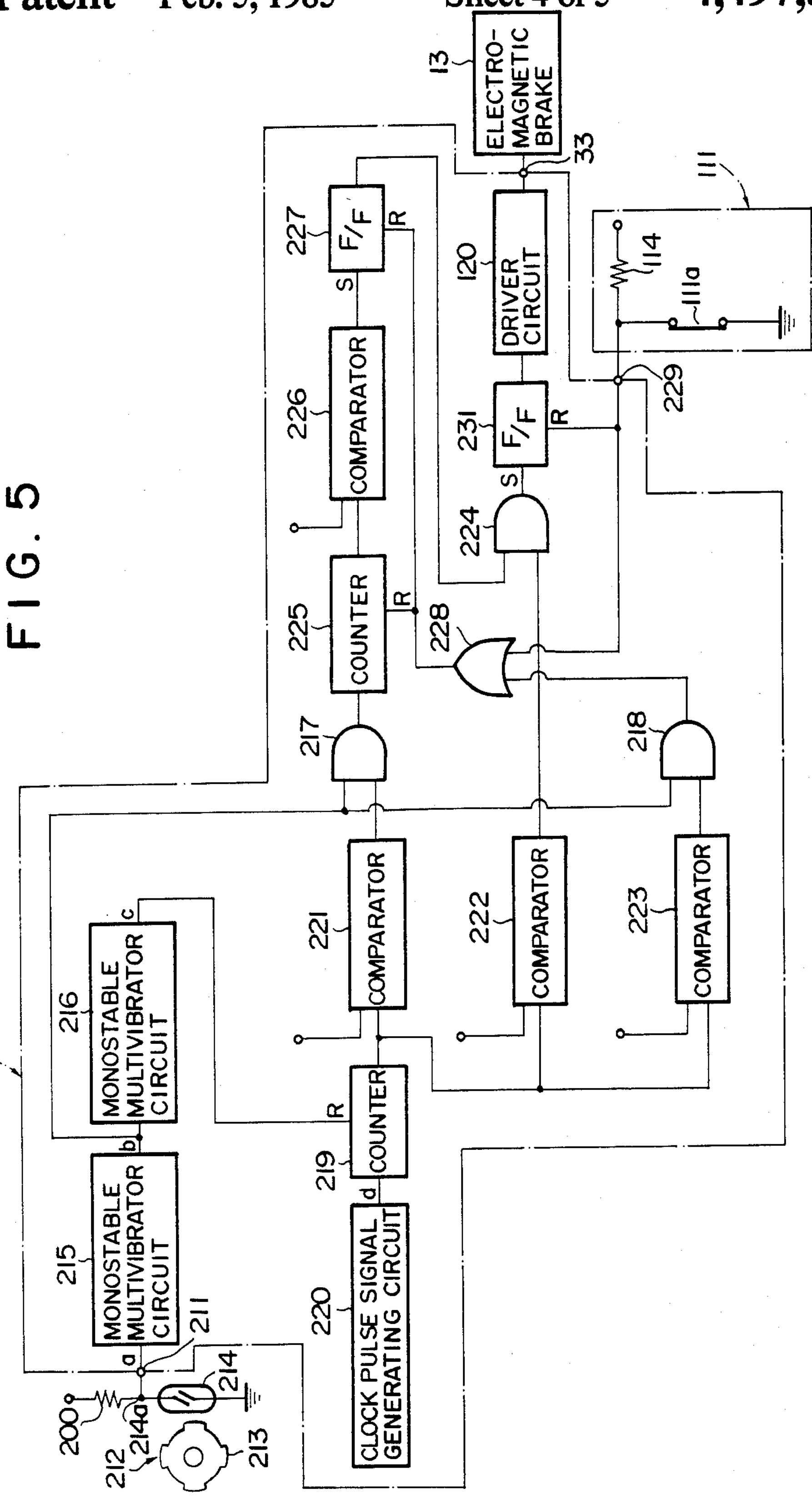
FIG. 5 is a schematic circuit diagram, similar to FIGS. 3 and 4, showing the construction, in a third preferred embodiment of the anti creep braking system according to the present invention which is otherwise the same as the first preferred embodiment thereof as shown in FIGS. 1 and 2, of said control system which is shown in FIG. 2 by a block.

In FIG. 5, there is shown the control system 23 used in a third preferred embodiment of the braking system according to the present invention, in a fashion similar to FIGS. 3 and 4. In FIG. 5, parts of the third preferred embodiment shown, which correspond to parts of the first and second preferred embodiments shown respectively in FIGS. 1 through 3, and in FIG. 4, and which have the same functions, are designated by the same reference numerals and symbols as in those figures.

THE CONTROL SYSTEM OF THE THIRD PREFERRED EMBODIMENT

Now, the control system 23 which selectively supplies actuating electrical energy to the electromagnetic coil 14 of the electromagnetic brake 13, in this third preferred embodiment of the anti creep braking system according to the present invention, will be explained. This control system 23 is shown in block diagram form in FIG. 5, along with the electromagnetic brake 13 which is schematically shown by a block. Also shown as a block denoted by the reference numeral 120 is a driver circuit 120 incorporated in said control system 23, similar to the driver circuit of the first and second preferred embodiments shown in FIGS. 3 and 4, which incorporates an electrical power supply starting circuit and an electrical power cutting off circuit, neither of which are particularly shown in the figures.

Now, in this third preferred embodiment, this electrical power supply starting circuit functions so as to commence the supply of actuating electrical energy to the electromagnetic brake 13, and the electrical power cutting off circuit within the driver circuit 120 functions so as to cut off the supply of actuating electrical energy to the electromagnetic brake 13, according to the selective supply to said driver circuit 120 of a 1 signal or of a 0 signal, this so called engage or disengage signal as will be seen later being provided from the output of a second flipflop circuit 231. And the rest of the control system 23 shown in FIG. 5, i.e. the part upstream in the control sense of the point where said so called engage or disengage signal enters the block 120, functions so as to generate this engage or disengage signal.

The gist of this shown third preferred embodiment of the anti creep braking system according to the present invention relates to the method of engaging of the electromagnetic brake 13, in order to avoid vehicle skidding, as will become apparent hereinafter. Accordingly, although for the sake of simplicity of explanation in this third preferred embodiment this engage or disengage signal generating part of said control system 23 operates only according to the signals from one sensor switch, which is an accelerator pedal sensor switch 111, which is similar to the accelerator pedal sensor switch 111 of the first and the second preferred embodiments of the present invention shown and described above, and does not include any parking range sensor switch such as the parking range sensor switch 112 of the first and the second preferred embodiments or any parking brake sensor switch such as the parking brake sensor switch 123 of the second preferred embodiment, it will be understood by one skilled in the art, based upon the disclosure in this specification, that the concepts shown with respect to said first and second preferred embodiments of the present invention for releasing the electromagnetic brake 13 can also be applied to this third preferred embodiment. This accelerator pedal sensor switch 111 is open when the accelerator pedal (not shown) which controls the internal combustion engine of the vehicle is not depressed at all, and is closed when said accelerator pedal is depressed by even a small amount from the non depressed condition. One terminal of the accelerator pedal sensor switch 111 is connected to ground, and the other terminal **111*a* of the accelerator pedal sensor switch 111 is connected via a resistive element 114 to a power source such as the battery of the vehicle. Thus, the voltage signal present at said other terminal 111*a* of said accelerator pedal sensor switch 111 is a 1 or 0 signal (taking ground potential as a 0 signal) indicating respectively whether said accelerator pedal sensor switch 111 is open or closed, i.e. respectively whether the accelerator pedal which controls the internal combustion engine of the vehicle is not depressed at all, or is depressed by even a small amount from the non depressed condition. This signal present at said other terminal 111*a* of said accelerator pedal sensor switch 111 is fed into said control system 23 through its input terminal 229**.

The control system 23 also comprises a vehicle wheel revolution speed sensor 212 which is of a per se well known kind, comprising a rotor 213 which is rotated at a speed proportional to the road speed of one of the wheels of the vehicle, which in the shown third preferred embodiment is a preferred wheel as far as the anti skid and brake engaging action is concerned. This rotor 213 has four lobes, in this third preferred embodiment, and these lobes repeatedly in turn push against the switched member of a reed switch 214, and release said switched member. One terminal of the reed switch 214 if connected to ground, and the other terminal **214*a* of the reed switch 214 is connected via a resistive element 200 to a power source such as the battery of the vehicle. Thus, the voltage signal, which will be referred to as signal "a" in the following, present at said other terminal 214*a* of the reed switch 214 is a 1 or 0 pulsed signal (taking ground potential as a 0 signal) indicating by its pulse frequency the rotational speed of said wheel of the vehicle, with the reed switch 214 opening and closing four times for each revolution of the rotor 213. As shown exemplarily in FIG. 6-*a*, in which graph time is the abscissa and voltage is the ordinate, this pulse voltage signal "a" present at said other terminal 214*a* of the reed switch 214** increases in frequency, i.e. decreases in wavelength, according to increasing rotational speed of said wheel of the vehicle.

Figure 6:
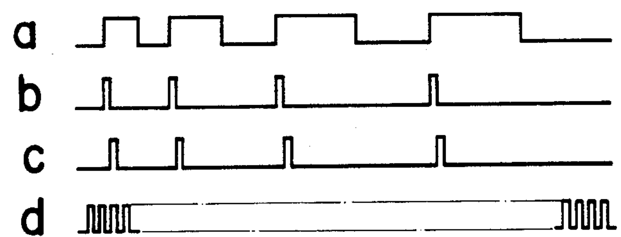
FIG. 6 is a time chart showing certain pulses which are produced during operation of the circuit shown in FIG. 5.

Inside the main part of the control system 23, this pulse signal "a" present at said other terminal **214*a* of the reed switch 214, which is fed into said control system 23 through its input terminal 211, is fed to the input of a first monostable multivibrator circuit 215, which produces an output pulse on a rise or upward slope of said pulse signal "a", as can be exemplarily seen in FIG. 6-*b*, in which graph time is the abscissa and voltage is the ordinate. This output signal of the monostable multivibrator circuit 215 will be referred to as signal "b" in the following. Signal "b" is fed to one input terminal of an AND gate 217 and to one input terminal of another AND gate 218, as will be explained later, and is also fed to the input of a second monostable multivibrator circuit 216, which produces an output pulse on a fall or downward slope of said pulse signal "b" output from the first monostable multivibrator circuit 215, as can be exemplarily seen in FIG. 6**-*c*, in which graph again time is the abscissa and voltage is the ordinate. This output signal of the second monostable multivibrator circuit 216 will be referred to as signal "c" in the following, and it will be understood by one skilled in the art that each pulse of the output signal "c" of the second monostable multivibrator circuit 216 starts just after the end of a corresponding pulse of the output signal "b" of the first monostable multivibrator circuit 215. This signal "c" output from the second monostable multivibrator circuit 216 is fed to the RESET terminal of a first counter 219, whose counting input is supplied with the clock pulse signal, which will be referred to as signal "d" in the following, output from a clock pulse signal generating circuit 220. This clock pulse signal "d" can be exemplarily seen in FIG. 6-*d*, in which graph again time is the abscissa and voltage is the ordinate.

Thus, the first counter 219 counts the number of clock pulses in the clock pulse signal "d" which it receives from the clock pulse signal generating circuit 220, from the last pulse of the output signal "c" of the second monostable multivibrator circuit 216 which RESET said first counter 219, and when the next pulse of said output signal "c" of the second monostable multivibrator circuit 216 is received by said first counter 219, said first counter 219 outputs the counted result at its output terminal and resets itself to zero for the next count. Accordingly, at the output terminal of said first counter 219 there appears, at every one of the pulses of the output signal "c" of the second monostable multivibrator circuit 216, i.e. just after every one of the pulses of the output signal "b" of the first monostable multivibrator circuit 215, a counted number indicative of the rotational speed of said preferred wheel of the vehicle. It will be obvious to one skilled in the art that this counted number is inversely proportional to said rotational speed of said preferred wheel: in other words, the higher is the rotational speed of said wheel, the lower is said counted number, and vice versa, because this counted number is the number of pulses of the clock pulse signal "d" generated by the clock pulse signal generating circuit 220 which are produced during the time period that the rotor 213 turns through a quarter of a turn, in this third preferred embodiment. This counted number is fed to one of the inputs of each of three comparators: a first comparator 221, a second comparator 222, and a third comparator 223.

The first comparator 221 compares the value of the counted number which is thus input to said first comparator 221 with a standard value which represents a first predetermined road speed which exemplarily in the following will be taken to be 15 kilometers per hour; and, if the value of said counted number represents a vehicle wheel revolution speed indicating a vehicle road speed of less than said first predetermined road speed, said first comparator 221 outputs a 1 signal at its output terminal. but otherwise outputs a 0 signal. This output signal of the first comparator 221 is fed to the other input terminal of the aforementioned AND gate 217. The second comparator 222 compares the value of the counted number which is also thus input to said second comparator 222 with a standard value which represents a second predetermined road speed which exemplarily in the following will be taken to be 2 kilometers per hour; and, if the value of said counted number represents a vehicle wheel revolution speed indicating a vehicle road speed of less than said second predetermined road speed, said second comparator 222 outputs a 1 signal at its output terminal, but otherwise outputs a 0 signal. This output signal of the second comparator 222 is fed to an input terminal of an AND gate 224. The third comparator 223 compares the value of the counted number which is also thus input to said third comparator 223 with a standard value which represents a third predetermined road speed which exemplarily in the following will be taken to be 16 kilometers per hour; and, if the value of said counted number represents a vehicle wheel revolution speed indicating a vehicle road speed of greater than said third predetermined road speed, said third comparator 223 outputs a 1 signal at its output terminal, but otherwise outputs a 0 signal. This output signal of the third comparator 223 is fed to the other input terminal of the aforementioned AND gate 218.

Thus, a 1 signal output from the first comparator 221 indicates a rotational speed of said preferred wheel corresponding to a vehicle road speed of less than said first predetermined road speed value of 15 kilometers per hour; a 1 signal output from the second comparator 222 indicates a rotational speed of said preferred wheel corresponding to a vehicle road speed of less than said second predetermined road speed value of 2 kilometers per hour; and a 1 signal output from the third comparator 223 includes a rotational speed of said preferred wheel corresponding to a vehicle road speed of less than said third predetermined road speed value of 16 kilometers per hour.

The AND circuit 217 thus receives at its lower input terminal in FIG. 5 a steady 1 or 0 signal indicating respectively whether or not the current rotational speed of said preferred wheel corresponds to a vehicle road speed of less than said first predetermined road speed value of 15 kilometers per hour or greater than said first predetermined road speed value, and receives at its upper input terminal in FIG. 5 the pulses of the pulse signal "b" output from the first monostable multivibrator circuit 215, if of course said preferred wheel is rotating at all; if on the other hand said preferred wheel is not rotating, then said AND circuit 217 of course receives no pulses at all at its upper terminal in FIG. 5. Accordingly, the output signal of said AND circuit 217 is a steady 0 signal, if either the current rotational speed of said preferred wheel corresponds to a vehicle road speed of greater than said first predetermined road speed value of 15 kilometers per hour, or said preferred wheel is not rotating at all; but otherwise, if said preferred wheel is rotating at least somewhat, but at a rotational speed which corresponds to a vehicle road speed of less than said first predetermined road speed value of 15 kilometers per hour, the output of said AND circuit 217 is a stream of pulses which occur at the same times as the pulses of the pulse signal "b" output from the first monostable multivibrator circuit 215.

Similarly, the AND circuit 218 thus receives at its lower input terminal in FIG. 5 a steady 1 or 0 signal indicating respectively whether or not the current rotational speed of said preferred wheel corresponds to a vehicle road speed of greater than said third predetermined road speed value of 16 kilometers per hour or less than said third predetermined road speed value, and receives at its upper input terminal in FIG. 5 the pulses of the pulse signal "b" output from the first monostable multivibrator circuit 215, if of course said preferred wheel is rotating at all; if on the other hand said preferred wheel is not rotating, then said AND circuit 218 of course receives no pulses at all at its upper terminal in FIG. 5. Accordingly, the output signal of said AND circuit 218 is a steady 0 signal, if either the current rotational speed of said preferred wheel corresponds to a vehicle road speed of less than said third predetermined road speed value of 16 kilometers per hour, or said preferred wheel is not rotating at all; but otherwise, if said preferred wheel is rotating at a rotational speed which corresponds to a vehicle road speed of greater than said third predetermined road speed value of 16 kilometers per hour, the output of said AND circuit 218 is a stream of pulses which occur at the same times as the pulses of the pulse signal "b" output from the first monostable multivibrator circuit 215.

The second counter 225 counts the pulses (if any) of the output signal of said AND circuit 217 that have occurred since said second counter 225 was last RESET as will be explained later, and outputs its counted result to the fourth comparator 226. This fourth comparator 226 compares this counted result with a standard predetermined count value, which may exemplarily be taken as 3; and, if said number of pulses of the output signal of said AND circuit 217 that have occurred since said second counter 225 was last RESET is greater than or equal to said standard predetermined count value of exemplarily 3, said fourth comparator outputs a 1 signal, while, if said number of pulses of the output signal of said AND circuit 217 that have occurred since said second counter 225 was last RESET is less than said standard predetermined count value of exemplarily 3, said fourth comparator outputs a 0 signal. In other words, a 1 signal output from the fourth comparator 226 indicates that since the last RESETting of the counter 225 the preferred wheel has rotated at a rotational speed indicative of a vehicle road speed of less than said first predetermined road speed value of 15 kilometers per hour for a certain predetermined road distance, which in fact corresponds to the distance the vehicle moves during three quarters of a turn of the rotor 213 in this third preferred embodiment, assuming that said preferred wheel does not slip on the road surface.

The output signal of the fourth comparator 226 is supplied to the SET terminal of a first flipflop circuit 227. When this first flipflop circuit 227 receives a 1 signal at its said SET terminal, it outputs a 1 signal at its output terminal until it next receives a 1 signal at its RESET terminal, after which said first flipflop circuit 227 outputs a 0 signal at its output terminal until it next receives a 1 signal at its SET terminal. The RESET terminal of this first flipflop circuit 227 is supplied with the output signal of an OR gate 228, which is also supplied to the RESET terminal of the second counter 225. The OR gate 228 is supplied at one of its input terminals with the output signal of the aforesaid AND gate 218, which as explained above is a steady 0 signal, if either the current rotational speed of said preferred wheel corresponds to a vehicle road speed of less than the third predetermined road speed value of 16 kilometers per hour, or said preferred wheel is not rotating at all; but otherwise, if said preferred wheel is rotating at a rotational speed which corresponds to a vehicle road speed of greater than said predetermined road speed value of 16 kilometers per hour, is a stream of pulses which occur at the same times as the pulses of the pulse signal "b" output from the first monostable multivibrator circuit 215. And the OR gate 228 is supplied at its other input terminal with the aforesaid voltage signal present at said other terminal 111*a* of said accelerator pedal sensor switch 111, which as previously stated is a 1 or 0 signal indicating respectively whether said accelerator pedal sensor switch 111 is open or closed, i.e respectively whether the accelerator pedal which controls the internal combustion engine of the vehicle is not depressed at all or is depressed by even a small amount from the non depressed condition, said signal present at said other terminal 111*a* of said accelerator pedal sensor switch 111 being fed into said control system 23 through its input terminal 229. Thus, if said preferred wheel is rotating at a current rotational speed which corresponds to a vehicle road speed of greater than said third predetermined road speed value of 16 kilometers per hour, or if the accelerator pedal of the vehicle is depressed by even a small amount, then said second counter 225 and said first flipflop circuit 227 are repeatedly RESET, but otherwise no resetting signal is inputted to their RESET terminals.

The output signal of the first flipflop circuit 227 is supplied to one of the input terminals of an AND circuit 224, the other of whose input terminals is supplied with the output signal from the second comparator 222, which as previously explained is a 1 signal if and only if said preferred wheel is rotating at a rotational speed corresponding to a vehicle road speed of less than said second predetermined road speed value of 2 kilometers per hour. The output of this AND circuit 224 is supplied to the SET terminal of the previously mentioned second flipflop circuit 231, the output signal of which is, as stated before, supplied to the electrical power supply starting circuit within the driver circuit 120, which functions so as to commence the supply of actuating electrical energy to the electromagnetic brake 13, and so as to cut off the supply of actuating electrical energy to the electromagnetic brake 13, according to the value of this so called engage or disengage signal provided from the output of said second flipflop circuit 231. Finally, the RESET terminal of the second flipflop 231 is supplied with the aforesaid voltage signal present at said other terminal 111*a* of said accelerator pedal sensor switch 111, which as previously stated is a 1 or 0 signal indicating respectively whether said accelerator pedal sensor switch 111 is open or closed, i.e. respectively whether the accelerator pedal which controls the internal combustion engine of the vehicle is not depressed at all or is depressed by even a small amount from the non depressed condition, via the input terminal 229 of the control system 23.

Thus, when a certain vehicle road distance has been traversed, without the vehicle road speed becoming over the first predetermined value of exemplarily 15 kilometers per hour or the revolution speed of the preferred wheel becoming zero, since the last time that either the vehicle road speed was greater than the third predetermined road speed value of exemplarily 16 kilometers per hour or the accelerator pedal was stepped on by even a little bit, i.e. since the last time that the OR circuit 228 outputted a 1 signal and performed a RESET action for the second counter 225 and for the first flipflop circuit 227, then as outlined before the output of the fourth comparator 226 becomes a 1 signal and RESETs the first flipflop circuit 227, so that its output signal is now a 1 signal from formerly being a 0 signal; and from this time point onwards the output signal of this first flipflop circuit 227 will continue to be a 1 signal, until either the vehicle road speed becomes greater than the third predetermined road speed value of exemplarily 16 kilometers per hour or the accelerator pedal is stepped on by even a little bit, i.e. until the OR circuit 228 outputs a 1 signal and performs a RESET action for the second counter 225 and for the first flipflop circuit 227. The meaning of this is that according to the logic of this third preferred embodiment if a certain vehicle road distance (corresponding to three quarters of a turn of the rotor 213) has been traversed without the vehicle road speed becoming over the first predetermined value of exemplarily 15 kilometers per hour or the revolution speed of the preferred wheel becoming zero since the last time that either the vehicle road speed was greater than the third predetermined road speed value of exemplarily 16 kilometers per hour or the accelerator pedal was stepped on by even a little bit, then it is taken that the preferred wheel is not skidding, and that the vehicle is coasting or is being braked to a halt. In this condition, when further the vehicle road speed becomes less than the second predetermined value of exemplarily 2 kilometers per hour, then the output of the second comparator 222 becomes a 1 signal, and at this time both of the inputs of the AND circuit 224 are 1 signals, and hence said AND circuit 224 outputs a 1 signal to the SET terminal of the second flipflop circuit 231.

When this second flipflop circuit 231 receives this 1 signal at its said SET terminal, it outputs a 1 signal at its output terminal until it next receives a 1 signal at its RESET terminal, after which second flipflop circuit 231 outputs a 0 signal at its output terminal until it next receives a 1 signal at its SET terminal. In other words, when the vehicle road speed becomes less than the second predetermined value of exemplarily 2 kilometers per hour, while the preferred wheel is not skidding and the vehicle is coasting or is being braked to a halt, then a 1 signal commences to be output to the driver circuit 120, which then functions so as to commence the supply of actuating electrical energy to the electromagnetic brake 13, and so as therefore, as explained above, to provide braking action locking on action for the braking system of the vehicle, in order to prevent creeping thereof. This supply of actuating electrical energy to the electromagnetic brake 13 continues until the RESET terminal of the second flipflop circuit 231 is supplied with a 1 signal from the said other terminal 111*a* of said accelerator pedal sensor switch 111, which as previously stated will indicate that said accelerator pedal sensor switch 111 is opened, i.e. that the accelerator pedal which controls the internal combustion engine of the vehicle has been depressed by even a small amount from the non depressed condition, at which time said supply of actuating electrical energy to the electromagnetic brake 13 is terminated, so as therefore, as also explained above, to properly terminate braking action locking on action for the braking system of the vehicle, in order to allow moving off from rest thereof.

Thus, it is seen that, if the vehicle, or at least the preferred wheel thereof, skids at a vehicle road speed of over the first predetermined road speed of exemplarily 15 kilometers per hour, then because the second counter 225 does not count as many as three (in this third preferred embodiment) of the pulses of the pulse signal "b" from the time that the rotational speed of said preferred wheel becomes less than said first predetermined speed of exemplarily 15 kilometers per hour, because during skidding of the preferred wheel it stops rotating completely, and hence the pulse signal "b" ceases to be produced at all, as explained above, therefore the first flipflop circuit 227 is not subjected to any SET action by the output signal from the fourth comparator 226, and hence the second flipflop circuit 231 is not subjected to any SET action by the output signal from the AND circuit 224, and hence no 1 signal is output to the driver circuit 120, which accordingly does not commence supply of actuating electrical energy to the electromagnetic brake 13. Accordingly, no braking action locking on action is provided for the braking system of the vehicle, and hence no danger exists of undesirably locking the vehicle into a skid.

On the other hand, if after the vehicle has been slowed down to a speed lower than the first predetermined speed of exemplarily 15 kilometers per hour by smooth non skidding application of the brakes thereof, so that as explained above the second counter 225 has counted as many as three (in this third preferred embodiment) of the pulses of the pulse signal "b" from the time that the rotational speed of said preferred wheel became less than said first predetermined speed of exemplarily 15 kilometers per hour, and thus the first flipflop circuit 227 is SET, and if then subsequently the road speed of the vehicle becomes greater than the third predetermined speed of exemplarily 16 kilometers per hour, or alternatively the vehicle is accelerated by even slight depression of the accelerator pedal thereof, then because the output of the AND circuit 218 becomes a 1 signal, or alternatively because a 1 signal is input to the input terminal 229 of the control system 23 from the said other terminal 111*a* of the accelerator pedal sensor switch 111, therefore the output of the OR circuit 228 also becomes a 1 signal, and hence the first flipflop circuit 227 is RESET so that its output signal is a 0 signal again. Hence the action of the shown control system 23, which was preparing for braking action locking on action, is cancelled.

Thus, it is seen that in the operation of this third preferred embodiment it is tested as to whether the preferred wheel is skidding or not, and if it is skidding then positively the braking force retaining action of the anti creep braking system according to this invention is not applied. Thus, it is positively prevented that the vehicle should become locked into a skid, which is advantageous from the point of view of safety, and increases the drivability and the controllability of the vehicle.

It will be clear to one skilled in the art, based upon the above disclosure, that although the shown third preferred embodiment considers the case of sensing the revolution speed of just one wheel of the vehicle, i.e. of the so called preferred wheel thereof, in fact it would not be difficult to modify and amplify the shown control system to consider the revolution speeds of all four of the wheels of a four wheeled vehicle. For example, in this case the control system 23 of the shown third embodiment might be provided in quadruplicate, and in this case the output signals from the four flipflop circuits corresponding to the shown second flipflop circuit 231 might be fed to a four way AND circuit, the output of which might be fed to the driver circuit 120. In this case, the anti creep braking system braking action retaining action provided by the present invention would only be provided, if it had been detected positively that no one of the four vehicle wheels was skidding. One skilled in the art can easily fill in the details of this possible variation, based upon the disclosure contained herein.

THE FOURTH PREFERRED EMBODIMENT

Figure 7:
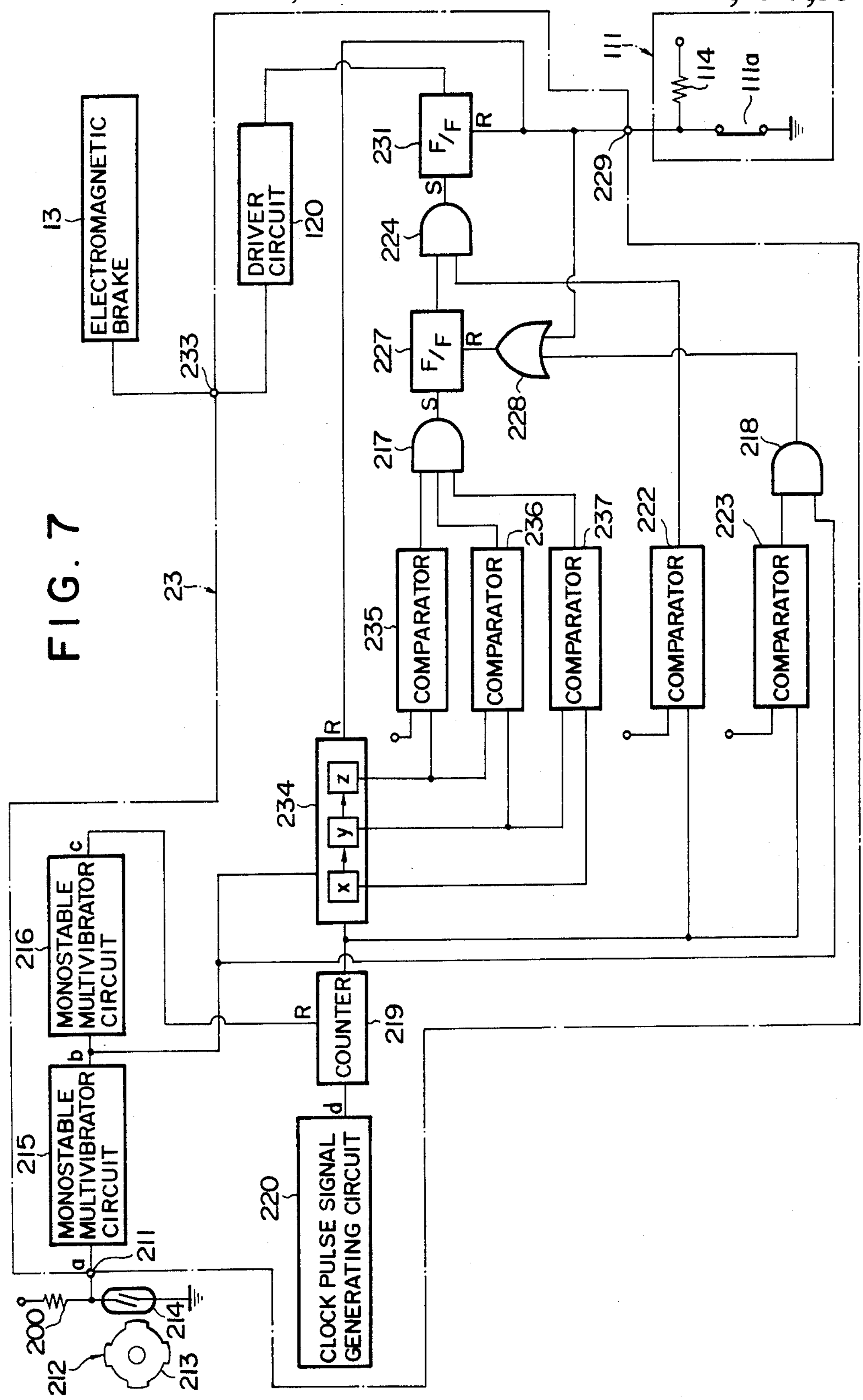
FIG. 7 is a schematic circuit diagram, similar to FIGS. 3, 4, and 5, showing the construction, in a fourth preferred embodiment of the anti creep braking system according to the present invention which is otherwise the same as the first preferred embodiment thereof as shown in FIGS. 1 and 2, of said control system which is shown in FIG. 2 by a block.

In FIG. 7, there is shown the control system 23 used in a fourth preferred embodiment of the braking system according to the present invention, in a fashion similar to FIGS. 3, 4, and 5. In FIG. 7, parts of the fourth preferred embodiment shown, which correspond to parts of the first, second, and third preferred embodiments shown respectively in FIGS. 1 through 3, in FIG. 4, and in FIG. 5, and which have the same functions, are designated by the same reference numerals and symbols as in those figures.

THE CONTROL SYSTEM OF THE FOURTH PREFERRED EMBODIMENT

Now, the control system 23 which selectively supplies actuating electrical energy to the electromagnetic coil 14 of the electromagnetic brake 13, in this fourth preferred embodiment of the anti creep braking system according to the present invention, will be explained. This control system 23 is shown in block diagram form in FIG. 7, along with the electromagnetic brake 13 which is schematically shown by a block. Also shown as a block and denoted by the reference numeral 120 is a driver circuit 120 incorporated in said control system 23, similar to the driver circuit of the first, second, and third preferred embodiments shown in FIGS. 3, 4, and 5, which incorporates an electrical power supply starting circuit and an electrical power cutting off circuit, neither of which are particularly shown in the figures.

Now, in this fourth preferred embodiment, this electrical power supply starting circuit functions so as to commence the supply of actuating electrical energy to the electromagnetic brake 13, and the electrical power cutting off circuit within the driver circuit 120 functions so as to cut off the supply of actuating electrical energy to the electromagnetic brake 13, according to the selective supply to said driver circuit 120 of a 1 signal or of a 0 signal, this so called engage or disengage signal as will be seen later being provided from the output of a second flipflop circuit 231. And the rest of the control system 23 shown in FIG. 7, i.e. the part upstream in the control sense of the point where said so called engage or disengage signal enters the block 120, functions so as to generate this engage or disengage signal.

The gist of this shown fourth preferred embodiment of the anti creep braking system according to the present invention relates to the method of engaging of the electromagnetic brake 13, in order to avoid vehicle skidding, as will become apparent hereinafter, similarly to the gist of the third preferred embodiment shown in FIG. 5. However, the details of this fourth preferred embodiment differ in some important aspects from the details of the third preferred embodiment. Accordingly, although for the sake of simplicity of explanation in this fourth preferred embodiment this engage or disengage signal generating part of said control system 23 operates only according to the signals from one sensor switch, which is an accelerator pedal sensor switch 111, which is similar to the accelerator pedal sensor switch 111 of the first and the second preferred embodiments of the present invention shown and described above, and the accelerator pedal sensor switch 111 of the third preferred embodiment, and although the control system 23 of this fourth preferred embodiment does not include any parking range sensor switch such as the parking range sensor switch 112 of the first and the second preferred embodiments or any parking brake sensor switch such as the parking brake sensor switch 123 of the second preferred embodiment, it will be understood by one skilled in the art, based upon the disclosure in this specification, that the concepts shown with respect to said first and second preferred embodiments of the present invention for releasing the electromagnetic brake 13 can also be applied to this fourth preferred embodiment. This accelerator pedal sensor switch 111 is open when the accelerator pedal (not shown) which controls the internal combustion engine of the vehicle is not depressed at all, and is closed when said accelerator pedal is depressed by even a small amount from the non depressed condition. One terminal of the accelerator pedal sensor switch 111 is connected to ground, and the other terminal **111*a* of the accelerator pedal sensor switch 111 is connected via a resistive element 114 to a power source such as the battery of the vehicle. Thus, the voltage signal present at said other terminal 111*a* of said accelerator pedal sensor switch 111 is a 1 or 0 signal (taking ground potential as a 0 signal) indicating respectively whether said accelerator pedal sensor switch 111 is open or closed, i.e. respectively whether the accelerator pedal which controls the internal combustion engine of the vehicle is not depressed at all, or is depressed by even a small amount from the non depressed condition. This signal present at said other terminal 111*a* of said accelerator pedal sensor switch 111 is fed into said control system 23 through its input terminal 229**.

The control system 23 also comprises a vehicle wheel revolution speed sensor 212 which is of a per se well known kind, comprising a rotor 213 which is rotated at a speed proportional to the road speed of one of the wheels of the vehicle, which in the shown fourth preferred embodiment again is a preferred wheel as far as the anti skid and brake engaging action is concerned. This rotor 213 has four lobes, in this fourth preferred embodiment, and these lobes repeatedly in turn push against the switched member of a reed switch 214, and release said switched member. One terminal of the reed switch 214 is connected to ground, and the other terminal **214*a* of the reed switch 214 is connected via a resistive element 200 to a power source such as the battery of the vehicle. Thus, the voltage signal, which will be referred to as signal "a" in the following, present at said other terminal 214*a* of the reed switch 214 is a 1 or 0 pulsed signal (taking ground potential as a 0 signal) indicating by its pulse frequency the rotational speed of said preferred wheel of the vehicle, with the reed switch 214 opening and closing four times for each revolution of the rotor 213. As shown exemplarily in FIG. 6-*a* (FIG. 6 generally may be taken to apply to this fourth preferred embodiment as well as to the third preferred embodiment), this pulse voltage signal "a" present at said other terminal 214*a* of the reed switch 214** increases in frequency, i.e. decreases in wavelength, according to increasing rotational speed of said preferred wheel of the vehicle.

Inside the main part of the control system 23, this pulse signal "a" present at said other terminal **214*a* of the reed switch 214, which is fed into said control system 23 through its input terminal 211, is fed to the input of a first monostable multivibrator circuit 215, which produces an output pulse on a rise or upward slope of said pulse signal "a", as can be exemplarily seen in FIG. 6**-*b*. This output signal of the monostable multivibrator circuit 215 will be referred to as signal "b" in the following. Signal "b" is fed to one input terminal of an AND gate 218 and to the SHIFT terminal of a shift register 234, as will be explained later, and is also fed to the input of a second monostable multivibrator circuit 216, which produces an output pulse on a fall or downward slope of said pulse signal "b" output from the first monostable multivibrator circuit 215, as can be exemplarily seen in FIG. 6-*c*. This output signal of the second monostable multivibrator circuit 216 will be referred to as signal "c" in the following, and it will be understood by one skilled in the art that each pulse of the output signal "c" of the second monostable multivibrator circuit 216 starts just after the end of a corresponding pulse of the output signal "b" of the first monostable multivibrator circuit 215. This signal "c" output from the second monostable multivibrator circuit 216 is fed to the RESET terminal of a first counter 219, whose counting input is supplied with the clock pulse signal, which will be referred to as signal "d" in the following, output from a clock pulse signal generating circuit 220. This clock pulse signal "d" can be exemplarily seen in FIG. 6-*d*.

Thus, the first counter 219 counts the number of clock pulses in the clock pulse signal "d" which it receives from the clock pulse signal generating circuit 220, from the last pulse of the output signal "c" of the second monostable multivibrator circuit 216 which RESET said first counter 219, and when the next pulse of said output signal "c" of the second monostable multivibrator circuit 216 is received by said first counter 219, said first counter 219 outputs the counted result at its output terminal and resets itself to zero for the next count. Accordingly, at the output terminal of said first counter 219 there appears, at every one of the pulses of the output signal "c" of the second monostable multivibrator circuit 216, i.e. just after every one of the pulses of the output signal "b" of the first monostable multivibrator circuit 215, a counted number indicative of the rotational speed of said preferred wheel of the vehicle. It will be obvious to one skilled in the art that this counted number is inversely proportional to said rotational speed of said preferred wheel: in other words, the higher is the rotational speed of said wheel, the lower is said counted number, and vice versa, because this counted number is the number of pulses of the clock pulse signal "d" generated by the clock pulse signal generating circuit 220 which are produced during the time period that the rotor 213 turns through a quarter of a turn, in this fourth preferred embodiment. This counted number is fed to the input terminal of the above mentioned shift register 234, and to one of the inputs of each of two comparators: a first comparator 222 and a second comparator 223.

The shift register 234 receives the value of this counted number of pulses from the first counter 219 at its input terminal, and, every time that said shift register 234 receives a SHIFT signal, i.e. a 1 pulse, at its SHIFT terminal from the first monostable multivibrator circuit 215, in other words at each one of the pulses of the output signal "b" of the first monostable multivibrator circuit 216 (the presence of which indicates that the preferred wheel is turning and is not locked, as in the previously described third preferred embodiment), said shift register 234 shifts the value formerly stored in its Y storage regiser to its Z storage register (the value in which is overwritten), shifts the value formerly stored in its X storage register to its Y storage register, and stores the value currently present at its input terminal in its X storage register. Further, this shift register 234 receives at its RESET terminal the signal present at said other terminal 111*a* of said accelerator pedal sensor switch 111, which as mentioned above is a 1 or 0 signal indicating respectively whether said accelerator pedal sensor switch 111 is open or closed, i.e. respectively whether the accelerator pedal which controls the internal combustion engine of the vehicle is not depressed at all, or is depressed by even a small amount from the non depressed condition, and which is fed into the control system 23 through its input terminal 229. I.e., the shift register 234 is RESET whenever the accelerator pedal of the vehicle is depressed by even a small amount. The value stored in the X storage register of the shift register 234 is fed to one of the inputs of a fourth comparator 237; the value stored in the Y storage register of the shift register 234 is fed to one of the inputs of a fourth comparator 236; and the value stored in the Z storage register of the shift register 234 is fed to one of the inputs of a third comparator 235. Further, the value stored in the Y storage register of the shift register 234 is also fed to the other input of the fifth comparator 237 as a reference value, and the value stored in the Z storage register of the shift register 234 is also fed to the other input of the fourth comparator 236 as a reference value. The third comparator receives a standard reference value signal indicative of a first predetermined road speed which exemplarily in the following will be taken to be 15 kilometers per hour.

Thus, the first comparator 222 compares the value of the counted number which is thus input to said first comparator 222 with a standard value which represents a second predetermined road speed which exemplarily in the following will be taken to be 2 kilometers per hour; and, if the value of said counted number represents a vehicle wheel revolution speed indicating a vehicle road speed of less than said second predetermined road speed, said first comparator 222 outputs a 1 signal at its output terminal, but otherwise outputs a 0 signal. This output signal of the first comparator 222 is fed to an input terminal of an AND gate 224. The second comparator 223 compares the value of the counted number which is also thus input to said second comparator 223 with a standard value which represents a third predetermined road speed which exemplarily in the following will be taken to be 16 kilometers per hour; and, if the value of said counted number represents a vehicle wheel revolution speed indicating a vehicle road speed of greater than said third predetermined road speed, said second comparator 223 outputs a 1 signal at its output terminal, but otherwise outputs a 0 signal. This output signal of the second comparator 223 is fed to the other input terminal of the aforementioned AND gate 218. The third comparator 235 compares the value stored in the Z storage register of the shift register 234 with said standard value which represents said first predetermined road speed which exemplarily has been taken to be 15 kilometers per hour; and, if the value of said counted number represents a vehicle wheel revolution speed indicating a vehicle road speed of less than said first predetermined road speed, said third comparator 235 outputs a 1 signal at its output terminal, but otherwise outputs a 0 signal. This output signal of the third comparator 235 is fed to a first input terminal of a three way AND gate 217. The fourth comparator 236 compares the value stored in the Y storage register of the shift register 234 with said value stored in the Z storage register of the shift register 234; and, if said value stored in the Y storage register of the shift register 234 represents a vehicle wheel revolution speed indicating a vehicle road speed of less than the road speed indicated by the vehicle wheel revolution speed represented by said value stored in the Z storage register of the shift register 234, said fourth comparator 236 outputs a 1 signal at its output terminal, but otherwise outputs a 0 signal. This output signal of the fourth comparator 236 is fed to the second input terminal of the three way AND gate 217. And the fifth comparator 237 compares the value stored in the X storage register of the shift register 234 with said value stored in the Y storage register of the shift register 234; and, if said value stored in the X storage register of the shift register 234 represents a vehicle wheel revolution speed indicating a vehicle road speed of less than the road speed indicated by the vehicle wheel revolution speed represented by said value stored in the Y storage register of the shift register 234, said fifth comparator 237 outputs a 1 signal at its output terminal, but otherwise outputs a 0 signal. This output signal of the fifth comparator 237 is fed to the third input terminal of the three way AND gate 217.

Thus, a 1 signal output from the first comparator 222 indicates a rotational speed of said preferred wheel corresponding to a vehicle road speed of less than said second predetermined road speed value of 2 kilometers per hour; a 1 signal output from the second comparator 223 indicates a rotational speed of said preferred wheel corresponding to a vehicle road speed of greater than said third predetermined road speed value of 16 kilometers per hour; a 1 signal output from the third comparator 235 indicates a rotational speed of said preferred wheel on the last but second pulse of the pulse signal "b" output from the first monostable vibrator circuit 215 corresponding to a vehicle road speed of less than said first predetermined road speed value of 15 kilometers per hour; a 1 signal output from the fourth comparator 236 indicates a rotational speed of said preferred wheel on the last but one pulse of the pulse signal "b" output from the first monostable vibrator circuit 215 corresponding to a vehicle road speed of less than the vehicle road speed to which the rotational speed of said preferred wheel on the last but second pulse of the aforesaid pulse signal "b" output from the first monostable vibrator circuit 215 corresponded; and, finally, a 1 signal which is output from the fifth comparator 237 is indicative of a rotational speed of said preferred wheel on the last pulse of the pulse signal "b" output from the first monostable vibrator circuit 215 corresponding to a vehicle road speed of less than the vehicle road speed to which the rotational speed of said preferred wheel on the last but one pulse of the pulse signal "b" output from the first monostable vibrator circuit 215 corresponded.

The AND circuit 217 thus receives at its upper input terminal in FIG. 7 a 1 or 0 signal indicating respectively whether or not the rotational speed of said preferred wheel on the last but second pulse of the pulse signal "b" output from the first monostable vibrator circuit 215 corresponds to a vehicle road speed of less than said first predetermined road speed value of 15 kilometers per hour or greater than said first predetermined road speed value; receives at its middle input terminal in FIG. 7 a 1 or 0 signal indicating respectively whether or not the rotational speed of said preferred wheel on the last but one pulse of the pulse signal "b" output from the first monostable vibrator circuit 215 corresponds to a vehicle road speed of less than the vehicle road speed to which the rotational speed of said preferred wheel on the last but second pulse of the pulse signal "b" output from the first monostable vibrator circuit 215 corresponds; and receives at its lower input terminal in FIG. 7 a 1 or 0 signal indicating respectively whether or not the rotational speed of said preferred wheel on the last pulse of the pulse signal "b" output from the first monostable vibrator circuit 215 corresponds to a vehicle road speed of less than the vehicle road speed to which the rotational speed of said preferred wheel on the last but one pulse of the pulse signal "b" output from the first monostable vibrator circuit 215 corresponds. All of these pulses are received by the AND circuit 217 simultaneously with each of the pulses of said the pulse signal "b" output from the first monostable vibrator circuit 215, which cause output of the values from the shift register 234; but if said pulses of said pulse signal "b" output from the first monostable vibrator circuit 215 are not present at all, i.e. if the preferred wheel is not rotating, then no input signals are received by the AND circuit 217 at any of its three input terminals.

Accordingly, the output signal of said AND circuit 217 is a steady 0 signal, if either said preferred wheel is not rotating at all, or the values of the rotational speed of said preferred wheel at the times of the last, the last but one, and the last but second pulses of the pulse signal "b" output from the first monostable vibrator circuit 215 do not correspond to a sequence of vehicle road speeds steadily decreasing from said first predetermined road speed value of 15 kilometers per hour; but otherwise, if said preferred wheel is rotating at least somewhat, and the values of the rotational speed of said preferred wheel at the times of the last, the last but one, and the last but second pulses of the pulse signal "b" output from the first monostable vibrator circuit 215 correspond to a sequence of vehicle road speeds steadily decreasing from said first predetermined road speed value of 15 kilometers per hour, then the output of said AND circuit 217 is a stream of pulses which occur at the same times as the pulses of the pulse signal "b" output from the first monostable multivibrator circuit 215.

In other words, a 1 signal output from the three way AND circuit 217 indicates that since the last RESETting of the shift register 234 the preferred wheel has rotated at a steadily diminishing rotational speed, but not a zero rotational speed, which is indicative of a steadily diminishing vehicle road speed of less than said first predetermined road speed value of 15 kilometers per hour for a certain predetermined road distance which in fact corresponds to the distance required for three pulses of the pulse signal "b" output from the first monostable multivibrator circuit 215 to occur, in this fourth preferred embodiment. This output signal from the AND circuit 217 is directly fed to the SET terminal of a first flipflop circuit 227.

Now, further the AND circuit 218 receives at its upper input terminal in FIG. 7 a 1 or 0 signal indicating respectively whether or not the current rotational speed of said preferred wheel corresponds to a vehicle road speed of greater than said third predetermined road speed value of exemplarily 16 kilometers per hour or less than said third predetermined road speed value, and receives at its lower input terminal in FIG. 7 the pulses of the pulse signal "b" output from the first monostable multivibrator circuit 215, if of course said preferred wheel is rotating at all; if on the other hand said preferred wheel is not rotating, then said AND circuit 218 of course receives no pulses at all at its upper terminal in FIG. 7. Accordingly, the output signal of said AND circuit 218 is a steady 0 signal, if either the current rotational speed of said preferred wheel corresponds to a vehicle road speed of less than said third predetermined road speed value of 16 kilometers per hour, or said preferred wheel is not rotating at all; but otherwise, if said preferred wheel is rotating at a rotational speed which corresponds to a vehicle road speed of greater than said third predetermined road speed value of 16 kilometers per hour, the output of said AND circuit 218 is a stream of pulses which occur at the same times as the pulses of the pulse signal "b" output from the first monostable multivibrator circuit 215.

When the first flipflop circuit 227 receives a 1 signal at its said SET terminal, it outputs a 1 signal at its output terminal until it next receives a 1 signal at its RESET terminal, after which said first flipflop circuit 227 outputs a 0 signal at its output terminal until it next receives a 1 signal at its SET terminal. The RESET terminal of this first flipflop circuit 227 is supplied with the output signal of an OR gate 228. The OR gate 228 is as mentioned above supplied at one of its input terminals with the output signal of the aforesaid AND gate 218, which as explained above is a steady 0 signal, if either the current rotational speed of said preferred wheel corresponds to a vehicle road speed of less than said third predetermined road speed value of 16 kilometers per hour, or said preferred wheel is not rotating at all; but otherwise, if said preferred wheel is rotating at a rotational speed which corresponds to a vehicle road speed of greater than said third predetermined road speed value of 16 kilometers per hour, is a stream of pulses which occur at the same times as the pulses of the pulse signal "b" output from the first monostable multivibrator circuit 215. And the OR gate 228 is supplied at its other input terminal with the aforesaid voltage signal present at said other terminal 111*a* of said accelerator pedal sensor switch 111, which as previously stated is a 0 or 1 signal indicating respectively whether said accelerator pedal sensor switch 111 is closed or open, i.e. respectively whether the accelerator pedal which controls the internal combustion engine of the vehicle is not depressed at all or is depressed by even a small amount from the non depressed condition, said signal present at said other terminal 111*a* of said accelerator pedal sensor switch 111 being fed into said control system 23 through its input terminal 229. Thus, if said preferred wheel is rotating at a current rotational speed which corresponds to a vehicle road speed of greater than said third predetermined road speed value of 16 kilometers per hour, or if the accelerator pedal of the vehicle is depressed by even a small amount, then said first flipflop circuit 227 is repeatedly RESET, but otherwise no resetting signal is inputted to its RESET terminal.

The output signal of the first flipflop circuit 227 is supplied to one of the input terminals of an AND circuit 224, the other of whose input terminals is supplied with the output signal from the first comparator 222, which as previously explained is a 1 signal if and only if said preferred wheel is rotating at a rotational speed corresponding to a vehicle road speed of less than said second predetermined road speed value of 2 kilometers per hour. The output of this AND circuit 224 is supplied to the SET terminal of the previously mentioned second flipflop circuit 231, the output signal of which is, as stated before, supplied to the electrical power supply starting circuit within the driver circuit 120, which functions so as to commence the supply of actuating electrical energy to the electromagnetic brake 13, and so as to cut off the supply of actuating electrical energy to the electromagnetic brake 13, according to the value of this so called engage or disengage signal provided from the output of said second flipflop circuit 231. Finally, the RESET terminal of the second flipflop 231 is supplied, via the input terminal 229 of the control system 23, with the aforesaid voltage signal present at said other terminal 111*a* of said accelerator pedal sensor switch 111, which as previously stated is a 0 or 1 signal indicating respectively whether said accelerator pedal sensor switch 111 is closed or open, i.e. respectively whether the accelerator pedal which controls the internal combustion engine of the vehicle is not depressed at all or is depressed by even a small amount from the non depressed condition.

Thus, when a certain road distance has passed since the vehicle road speed became below the first predetermined value of exemplarily 15 kilometers per hour, with the vehicle road speed steadily dropping and without the revolution speed of the preferred wheel becoming zero, since the last time that either the vehicle road speed was greater than the third predetermined road speed value of exemplarily 16 kilometers per hour or the accelerator pedal was stepped on by even a little bit, i.e. since the last time that the OR circuit 228 outputted a 1 signal and performed a RESET action for the first flipflop circuit 227, then as outlined before the output of the AND gate 217 becomes a 1 signal and SETs the first flipflop circuit 227, so that its output signal is now a 1 signal from formerly being a 0 signal; and from this time point onwards the output signal of this first flipflop circuit 227 will continue to be a 1 signal, until either the vehicle road speed becomes greater than the third predetermined road speed value of exemplarily 16 kilometers per hour or the accelerator pedal is stepped on by even a little bit, i.e. until the OR circuit 228 outputs a 1 signal and performs a RESET action for the first flipflop circuit 227. The meaning of this is that according to the logic of this fourth preferred embodiment if a certain road distance has passed with the vehicle road speed steadily dropping from the first predetermined value of exemplarily 15 kilometers per hour, without the vehicle road speed becoming over the first predetermined value of exemplarily 15 kilometers per hour or the revolution speed of the preferred wheel becoming zero, since the last time that either the vehicle road speed was greater than the third predetermined road speed value of exemplarily 16 kilometers per hour or the accelerator pedal was stepped on by even a little bit, then it is taken that the preferred wheel is not skidding, and that the vehicle is coasting or is being braked to a halt. In this condition, when further the vehicle road speed becomes less than the second predetermined value of exemplarily 2 kilometers per hour, then the output of the first comparator 222 becomes a 1 signal, and at this time both of the inputs of the AND circuit 224 are 1 signals, and hence said AND circuit 224 outputs a 1 signal to the SET terminal of the second flipflop circuit 231.

When this second flipflop circuit 231 receives this 1 signal at its said SET terminal, it outputs a 1 signal at its output terminal until it next receives a 1 signal at its RESET terminal, after which said second flipflop circuit 231 outputs a 0 signal at its output terminal until it next receives a 1 signal at its SET terminal. In other words, when the vehicle road speed becomes less than the second predetermined value of exemplarily 2 kilometers per hour, while the preferred wheel is not skidding and the vehicle is coasting or is being braked to a halt, then a 1 signal commences to be output to the driver circuit 120, which then functions so as to commence the supply of actuating electrical energy to the electromagnetic brake 13, and so as therefore, as explained above, to provide braking action locking on action for the braking system of the vehicle, in order to prevent creeping thereof. This supply of actuating electrical energy to the electromagnetic brake 13 continues until the RESET terminal of the second flipflop circuit 231 is supplied with a 1 signal from the said other terminal 111*a* of said accelerator pedal sensor switch 111, which as previously stated will indicate that said accelerator pedal sensor switch 111 is opened, i.e. that the accelerator pedal which controls the internal combustion engine of the vehicle has been depressed by even a small amount from the non depressed condition, at which time said supply of actuating electrical energy to the electromagnetic brake 13 is terminated, so as therefore, as also explained above, to properly terminate braking action locking on action for the braking system of the vehicle, in order to allow moving off from rest thereof.

Thus, it is seen that, if the vehicle, or at least the preferred wheel thereof, skids at a vehicle road speed of over the first predetermined road speed of exemplarily 15 kilometers per hour, then because three (in this fourth preferred embodiment) of the pulses of the pulse signal "b" from the time that the rotational speed of said preferred wheel becomes less than said first predetermined speed of exemplarily 15 kilometers per hour do not occur, because during skidding of the preferred wheel it stops rotating completely, and hence the pulse signal "b" ceases to be produced at all, as explained above, therefore the first flipflop circuit 227 is not subjected to any SET action by the output signal from the AND circuit 217, and hence the second flipflop circuit 231 is not subjected to any SET action by the output signal from the AND circuit 224, and hence no 1 signal is output to the driver circuit 120, which accordingly does not commence supply of actuating electrical energy to the electromagnetic brake 13. Accordingly, no braking action locking on action is provided for the braking system of the vehicle, and hence no danger exists of undesirably locking the vehicle into a skid.

On the other hand, if after the vehicle has been slowed down to a speed lower than the first predetermined speed of exemplarily 15 kilometers per hour by smooth non-skidding application of the brakes thereof, so that as explained above three (in this fourth preferred embodiment) of the pulses of the pulse signal "b" from the time that the rotational speed of said preferred wheel became less than said first predetermined speed of exemplarily 15 kilometers per hour have occurred while the vehicle speed is steadily decreasing, and thus the first flipflop circuit 227 is SET, and if then subsequently the road speed of the vehicle becomes greater than the third predetermined speed of exemplarily 16 kilometers per hour, or alternatively the vehicle is accelerated by even slight depression of the accelerator pedal thereof, then because the output of the AND circuit 218 becomes a 1 signal, or alternatively because a 1 signal is input to the input terminal 229 of the control system 23 from the said other terminal 111*a* of the accelerator pedal sensor switch 111, therefore the output of the OR circuit 228 also becomes a 1 signal, and hence the first flipflop circuit 227 is RESET so that its output signal is a 0 signal again. Hence the action of the shown control system 23, which was preparing for braking action locking on action, is cancelled.

Thus, it is seen that in the operation of this fourth preferred embodiment it is tested as to whether the preferred wheel is skidding or not, and if it is skidding then positively the braking force retaining action of the anti creep braking system according to this invention is not applied. Thus, it is positively prevented that the vehicle should become locked into a skid, which is advantageous from the point of view of safety, and increases the drivability and the controllability of the vehicle.

It will be clear to one skilled in the art, based upon the above disclosure, that although again the shown fourth preferred embodiment considers the case of sensing the revolution speed of just one wheel of the vehicle, i.e. of the so called preferred wheel thereof, in fact it would not be difficult to modify and amplify the shown control system to consider the revolution speeds of all four of the wheels of a four wheeled vehicle. For example, again in this case the control system 23 of the shown fourth preferred embodiment might be provided in quadruplicate, and in this case the output signals from the four flipflop circuits corresponding to the shown second flipflop circuit 231 might be fed to a four way AND circuit, the output of which might be fed to the driver circuit 120. In this case, the anti creep braking system braking action retaining action provided by the present invention would only be provided, if it had been detected positively that no one of the four vehicle wheels was skidding. One skilled in the art can again easily fill in the details of this possible variation, based upon the disclosure contained herein.

Although the present invention has been shown and described with reference to several preferred embodiments thereof, and in terms of the illustrative drawings, it should not be considered as limited thereby. Various possible modifications, omissions, and alterations could be conceived of by one skilled in the art to the form and the content of any particular embodiment, without departing from the scope of the present invention. Therefore it is desired that the scope of the present invention, and of the protection sought to be granted by Letters Patent, should be defined not by any of the perhaps purely fortuitous details of the shown embodiments, or of the drawings, but solely by the scope of the appended claims, which follow.

What is claimed is:

1. An anti creep braking system for a vehicle, comprising: a brake pedal movable to and fro with respect to said vehicle and adapted to be moved in a first direction by a vehicle operator in order to generate braking force;

a braking force generation system drivingly connected with said brake pedal and adapted to generate a braking force that brakes said vehicle with increased intensity when said brake pedal is moved more in said first direction;

a brake holding member movable with respect to said vehicle; a one way clutch;

a braking device which selectively allows or prevents the movement of said brake holding member with respect to said vehicle;

and a control system for controlling said braking device so as selectively to allow to prevent the movement of said brake holding member with respect to said vehicle;

said brake holding member being drivingly connected with said brake pedal via said one way clutch to be moved with respect to said vehicle, the sense of force transmission of said one way clutch being such that said brake pedal can move freely with respect to said brake holding member in said first direction but any movement of said brake pedal in a direction opposite to said first direction is transmitted to said brake holding member via said one way clutch.

2. An anti creep braking system according to claim 1, wherein said control system includes an accelerator pedal operation sensing system and releases said brake holding member to move with respect to said vehicle when said accelerator pedal operation sensing system senses accelerator pedal depression which effects acceleration of said vehicle.

3. An anti creep braking system according to claim 1, wherein said control system includes a parking range sensing system and releases said brake holding member to move with respect to said vehicle when said parking range sensing system senses establishment of the parking range in said vehicle.

4. An anti creep braking system according to claim 1, wherein said control system further includes a parking brake operation sensing system and releases said brake holding member to move with respect to said vehicle when said parking range sensing system senses establishment of parking range and said parking brake operation sensing system also senses parking brake actuation.

5. An anti creep braking system according to claim 1, wherein said control system includes a vehicle wheel revolution speed sensing system and prevents said brake holding member from moving with respect to said vehicle when said vehicle wheel revolution speed sensing system senses that the vehicle wheel revolution speed had been a positive speed value and is reduced to be lower than a predetermined very low speed value which means that said vehicle has almost stopped.

6. An anti creep braking system according to claim 1, wherein said control system includes a vehicle wheel revolution speed sensing system and prevents said brake holding member from moving with respect to said vehicle when said vehicle wheel revolution speed sensing system has sensed that the vehicle wheel revolution speed had been a positive speed value lower than a predetermined speed value and reduced to be lower than a predetermined very low speed value which means that said vehicle has almost stopped.

7. An anti creep braking system according to claim 1, wherein said control system includes a vehicle wheel revolution speed sensing system and prevents said brake holding member from moving with respect to said vehicle when said vehicle wheel revolution speed sensing system has sensed that the vehicle wheel revolution speed had been gradually reduced for a certain period and reduced to be lower than a predetermined very low speed value which means that said vehicle has almost stopped.

8. An anti creep braking system according to claim 1, wherein said control system includes a vehicle wheel revolution speed sensing system and prevents said brake holding member from moving with respect to said vehicle when said vehicle wheel revolution speed sensing system has sensed that the vehicle wheel revolution speed had been gradually reduced for a certain period at speeds lower than a predetermined speed and reduced to be lower than a predetermined very low speed value which means that said vehicle has almost stopped.

9. An anti creep braking system according to claim 5, wherein said control system comprises a vehicle wheel revolution speed dependent electrical pulse generation system which generates vehicle wheel revolution speed dependent electrical pulses, the frequency of which corresponds to vehicle revolution speed, a clock pulse signal generating circuit which generates a series of clock pulses, a first counter which is reset by each of said vehicle wheel revolution speed dependent electrical pulses and counts said clock pulses between each two adjacent resetting moments thereof to output certain count signals, a first comparator which receives said certain count signals from said first counter and outputs a certain ouput signal when said certain count signals received from said first counter are larger than a first predetermined number value, a first AND gate which receives said certain output signal from said first comparator and said vehicle wheel revolution speed dependent electrical pulses from said vehicle wheel revolution speed dependent electrical pulse generation system and outputs certain output signals when both of the two input signals thereto exist, a second comparator which receives said certain count signals from said first counter and outputs a certain output signal when said certain count signals from said first counter are larger than a second predetermined number value, a second counter which receives said certain output signals from said first AND gate and counts the number of the input signals thereto until it is reset and outputs a certain count signal, a third comparator which receives said certain count signal from said second counter and outputs a certain output signal when said count signal from said second counter is larger than a third predetermined number value, a first flipflop circuit which is set by said certain output signal from said third comparator and is reset when a reset signal is inputed thereto, said first flipflop circuit outputing a certain output signal when it is set, an accelerator pedal operation sensing system which outputs a certain output signal when it is sensing accelerator pedal depression which effects acceleration of said vehicle, a second AND gate which receives said certain output signal from said first flipflop circuit and said certain output signal from said second comparator and outputs a certain output signal when both of the two input signals thereto exist, a second flipflop circuit which is set by said certain output signal from said second AND gate and is reset by said certain output signal from said accelerator pedal operation sensing system and outputs a certain output signal when it is set, and a driver circuit which receives said certain output signal from said second flipflop circuit and actuates said braking device so as to prevent said brake holding member from moving with respect to said vehicle.

10. An anti creep braking system according to claim 9, wherein said control system further comprises a fourth comparator which received said certain count signals from said first counter and outputs a certain output signal when said certain count signals are smaller than a fourth predetermined number value, a third AND gate which receives said certain output signal from said fourth comparator and said vehicle wheel revolution speed dependent electrical pulses from said vehicle wheel revolution speed dependent electrical pulse generation system and outputs a certain output signal when both of the two input signals thereto exist, and an OR gate which incorporates said certain output signal from said third AND gate into the reseting of said second counter and said first flipflop circuit in addition to the reseting of said second counter and said first flipflop circuit by said certain output signal from said accelerator pedal operation sensing system so that said second counter and said first flipflop circuit are reset by at least either of said certain output signal from said third AND gate and said certain output signal from said accelerator pedal operation sensing system.

11. An anti creep braking system according to claim 7, wherein said control system comprises a vehicle wheel revolution speed dependent electrical pulse generation system which generates vehicle wheel revolution speed dependent electrical pulses the frequency of which corresponds to vehicle wheel revolution speed, a clock pulse signal generating circuit which generates a series of clock pulses, a first counter which is reset by each of said vehicle wheel revolution speed dependent electrical pulses and counts said clock pulses between each two adjacent reseting moments thereof to output certain count signals, a shift register which receives said certain count signals from said first counter and said vehicle wheel revolution speed dependent electrical pulses from said vehicle wheel revolution speed dependent electrical pulse generation system, said shift register including a plurality of sub-registers such as first, second, and third sub-registers, said first sub-register first receiving said certain count signals from said first counter when a first one of said vehicle wheel revolution speed dependent electrical pulses is supplied, then said first sub-register transferring the count signal registered therein to said second sub-register while receiving a next count signal from said first counter when a second one of said vehicle wheel revolution speed dependent electrical pulses is supplied thereto, then said second sub-register transferring the count signal registered therein to said third sub-register while receiving the count signal registered in said first sub-register therefrom when said first sub-register transfers the count signal registered therein to said second sub-register when said first sub-register receives a next count signal from said first counter when a third one of said vehicle wheel revolution speed dependent electrical pulses is supplied thereto, and so on, all of said sub-registers being reset when a reset signal is supplied to said shift register, a plurality of first comparators cooperating with said plurality of sub-registers in said shift register to check if the count signals sequentially outputed from said first counter are increasing, said plurality of comparators outputing certain output signals respectively when said sequential count signals from said first counter are increasing, said certain output signals from said plurality of comparators being supplied to a first AND gate which outputs a certain output signal when all of the input signals thereto exist, a first flipflop circuit which is set by said certain output signal from said first AND gate to output a certain output signal and is reset when a reset signal is inputed thereto, a second comparator which receives said count signals from said first counter and outputs a certain output signal when said count signals from said first counter are larger than a first predetermined number value, a second AND gate which receives said certain output signal from said first flipflop circuit and said certain output signal from said second comparator and outputs a certain output signal when both of the two inputs thereto exist, a second flipflop circuit which is set by said certain output signal from said second AND gate to output a certain output signal and is reset when a reset signal is supplied thereto, an accelerator pedal operation sensing system which outputs a certain output signal when it senses accelerator pedal depression which effects acceleration of said vehicle, said certain output signal from said accelerator pedal operation sensing system being supplied as a reset signal to said shift register and said first and second flipflop circuits, and a driver circuit which receives said certain output signal from said second flipflop circuit and actuates said braking device so as to prevent said brake holding member from moving with respect to said vehicle.

12. An anti creep braking system according to claim 11, wherein said control system further comprises a third comparator which receives said certain count signals from said first counter and outputs a certain output signal when said certain count signals are smaller than a second predetermined number value, a third AND gate which receives said certain output signal from said third comparator and said vehicle wheel revolution speed dependent electrical pulses from said vehicle wheel revolution speed dependent electrical pulse generation system and outputs a certain output signal when both of the two input signals thereto exist, an and OR gate which incorporates said certain output signal from said third AND gate into the reseting of said first flipflop circuit in addition to the reseting of said first flipflop by said certain output signal from said accelerator pedal operation sensing system so that said first flipflop circuit is reset by at least either of said certain output signal from said accelerator pedal operation sensing system and said certain output signal from said third AND gate.

* * * * *